(12) United States Patent
Takeuchi

(10) Patent No.: US 8,643,227 B2
(45) Date of Patent: Feb. 4, 2014

(54) LINEAR MOTOR

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 308 days.

(21) Appl. No.: 13/245,068

(22) Filed: Sep. 26, 2011

(65) Prior Publication Data

US 2012/0098469 A1 Apr. 26, 2012

(30) Foreign Application Priority Data

Oct. 21, 2010 (JP) .................................. 2010-236323

(51) Int. Cl.
*H02K 11/00* (2006.01)
*H02K 41/02* (2006.01)

(52) U.S. Cl.
USPC ........ 310/12.19; 310/68 B; 318/135; 318/153

(58) Field of Classification Search
USPC ............. 310/68 B, 12.19; 318/687, 135, 652, 318/653
See application file for complete search history.

(56) References Cited

U.S. PATENT DOCUMENTS 7,786,631 B2   8/2010 Sasaki et al.
7,830,109 B2 * 11/2010 Sasaki et al. .................. 318/687
2005/0280316 A1 * 12/2005 Nozawa et al. .................. 310/12
2008/0265807 A1 * 10/2008 Rose ............................. 318/135
2009/0096310 A1 *  4/2009 Takeuchi ................. 310/156.36

FOREIGN PATENT DOCUMENTS

JP          2008-289344          11/2008

* cited by examiner

*Primary Examiner* — Tran Nguyen
*Assistant Examiner* — Leda Pham
(74) *Attorney, Agent, or Firm* — Harness, Dickey & Pierce, P.L.C.

(57) ABSTRACT

A linear motor includes a slider unit having a magnet row in which plural permanent magnets are arranged in series so that the same poles are opposed to each other, a stator unit including electromagnetic coils for plural phases arranged along a movement direction of the slider unit, and plural magnetic detector devices, wherein the plural magnetic detector devices are provided in response to the phases of the electromagnetic coils for plural phases and detect magnetic flux radially extending in a direction perpendicular to the arrangement direction of the permanent magnets at boundaries between the permanent magnets of the magnet row and output signal waveforms for plural phases at phases equal to phases of waveforms of back electromotive forces generated in the respective electromagnetic coils for plural phases when the magnet row moves.

4 Claims, 31 Drawing Sheets

FIG. 4A A-PHASE POSITION DETECTION SENSOR
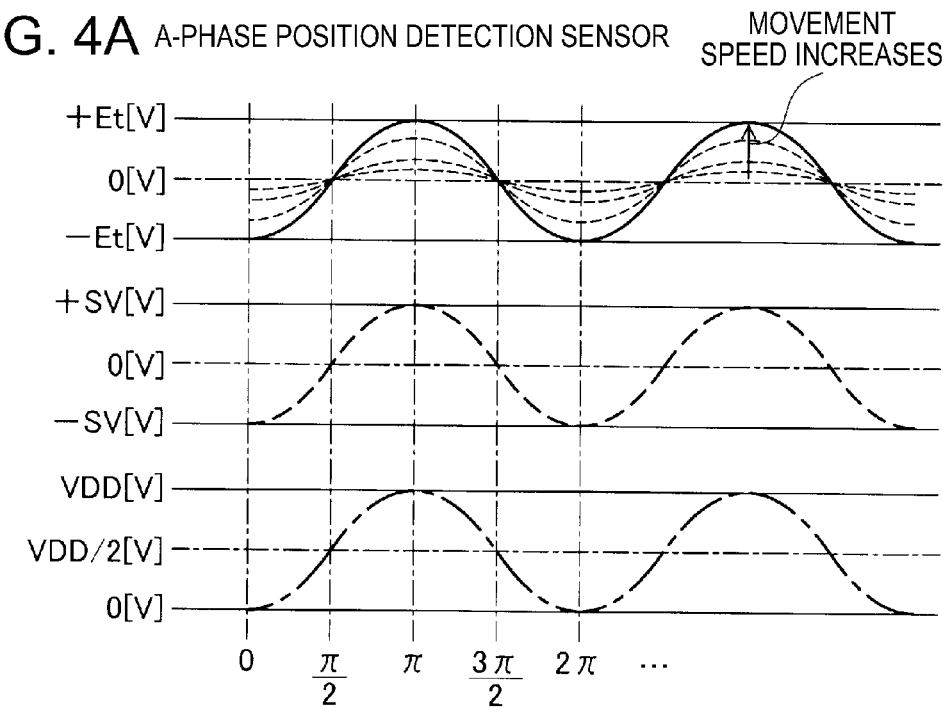
FIG. 4B B-PHASE POSITION DETECTION SENSOR
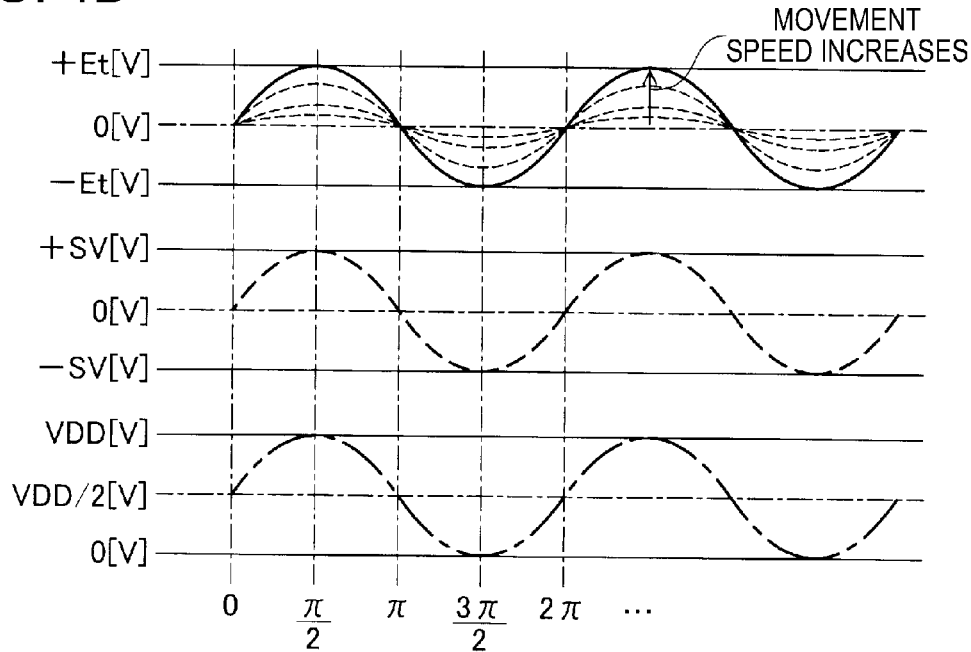

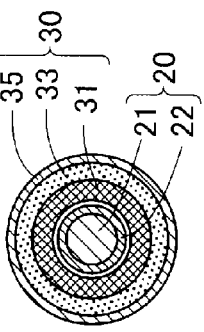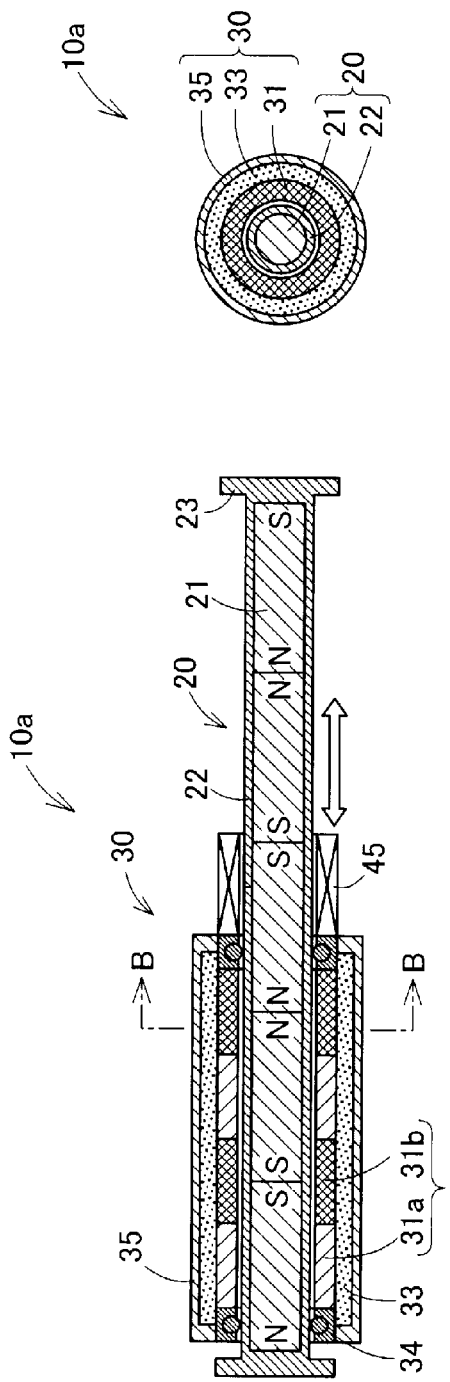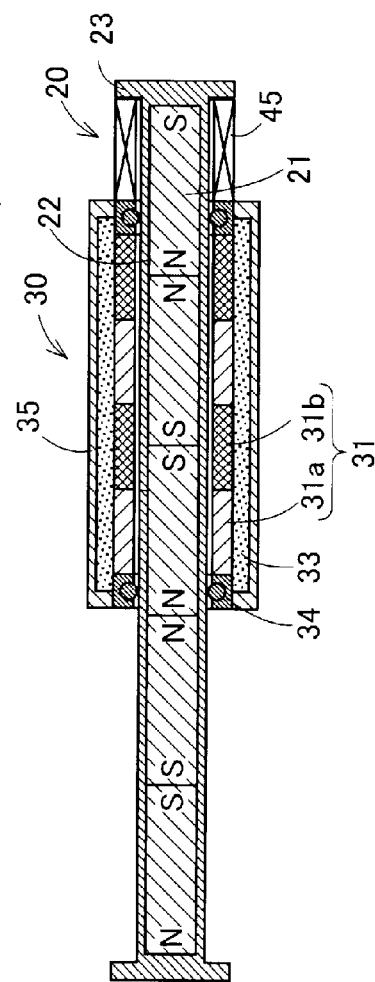
FIG. 5B
FIG. 5A
FIG. 5C

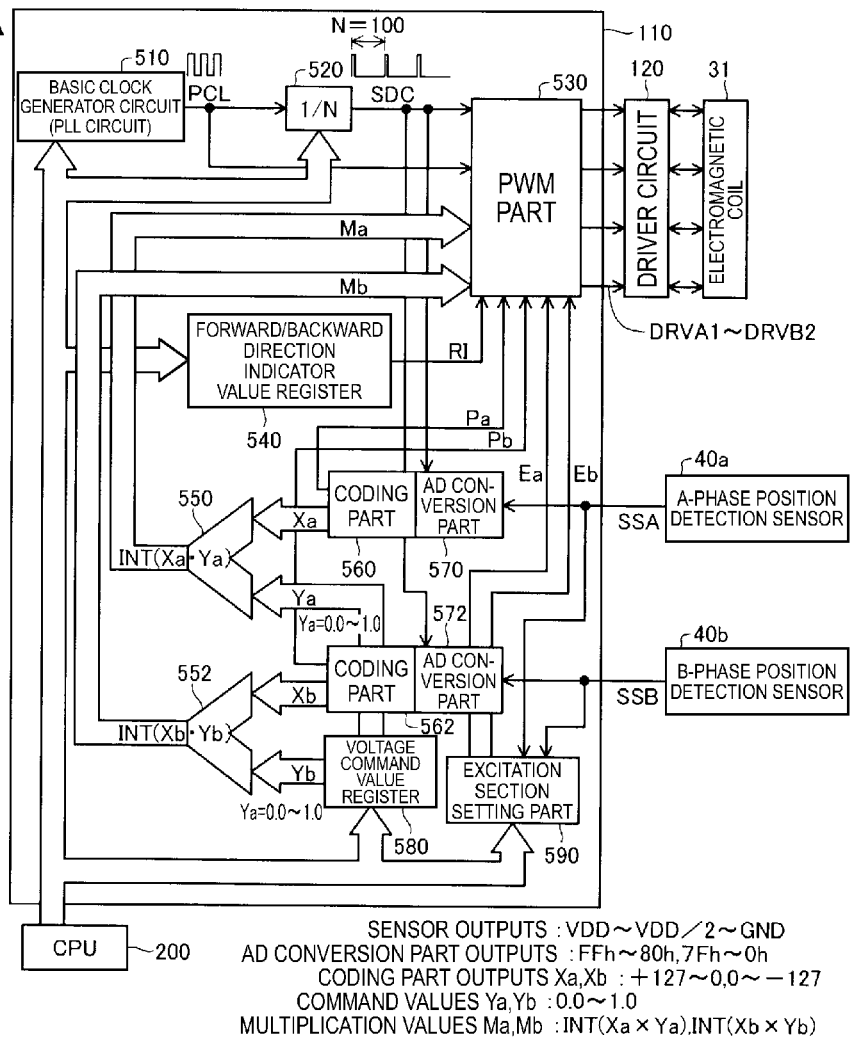
FIG. 7A
FIG. 7B DRVA1+DRVA2   Ma=0
FIG. 7C DRVA1+DRVA2   Ma=+10   Ma=−10
FIG. 7D DRVA1+DRVA2   Ma=+30   Ma=−30
FIG. 7E DRVA1+DRVA2   Ma=+60   Ma=−60

FIG. 8A
SSA
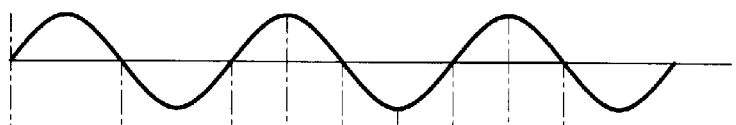
FIG. 8B
SSB
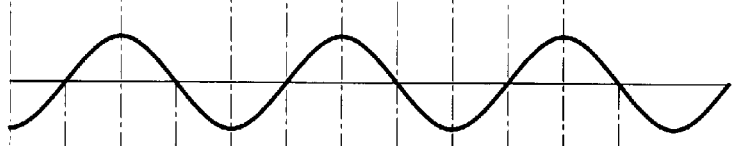
FIG. 8C
DRVA1+DRVA2
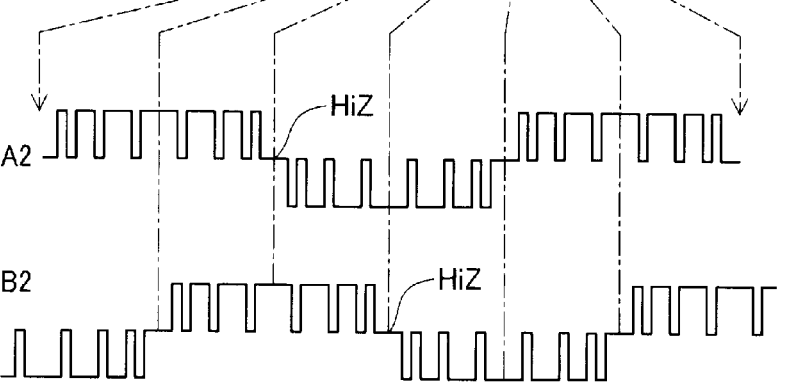
FIG. 8D
DRVB1+DRVB2
FIG. 8E
DRVA1+DRVA2   NON-EXCITATION SECTION NEP
EXCITATION SECTION EP
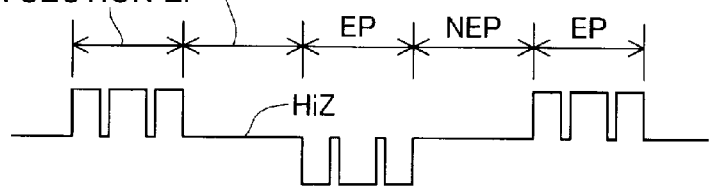
FIG. 8F
DRVB1+DRVB2
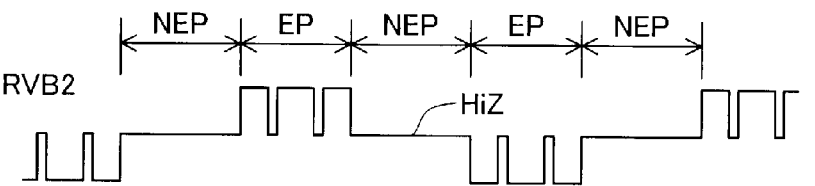

FIG.19A FORWARD MOVEMENT
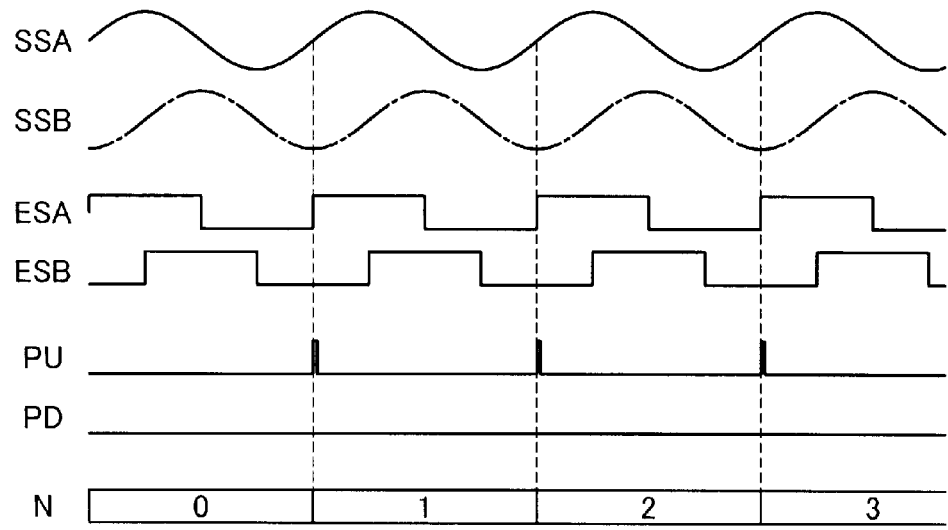
FIG.19B BACKWARD MOVEMENT
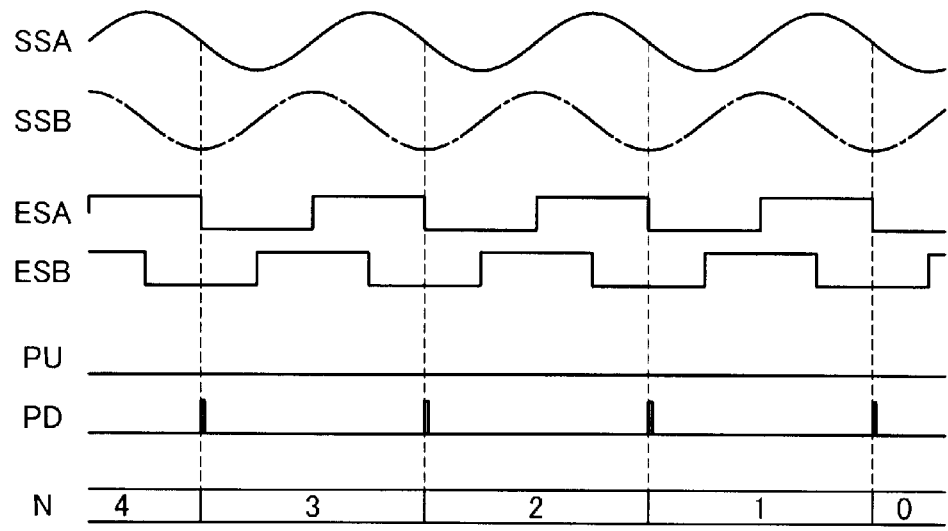

FIG.21A 0
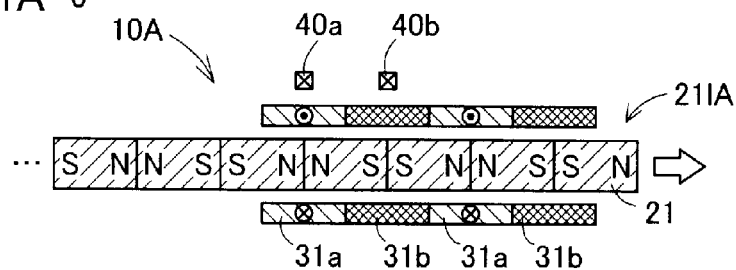
FIG.21B $\frac{\pi}{2}$
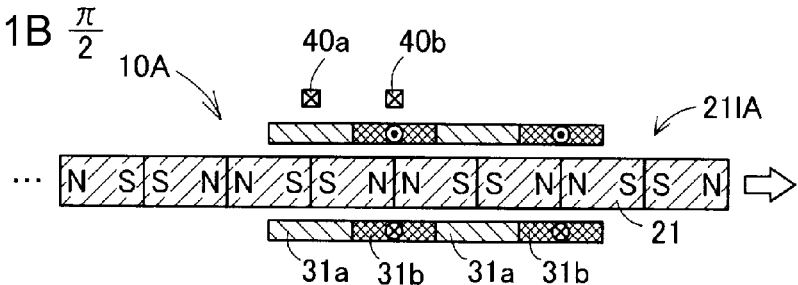
FIG.21C $\pi$
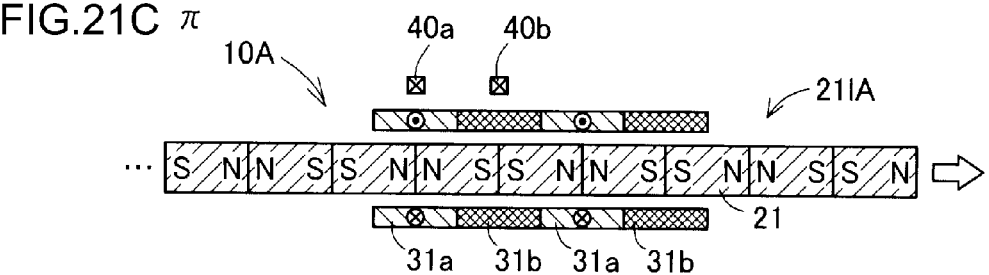
FIG.21D $\frac{3\pi}{2}$
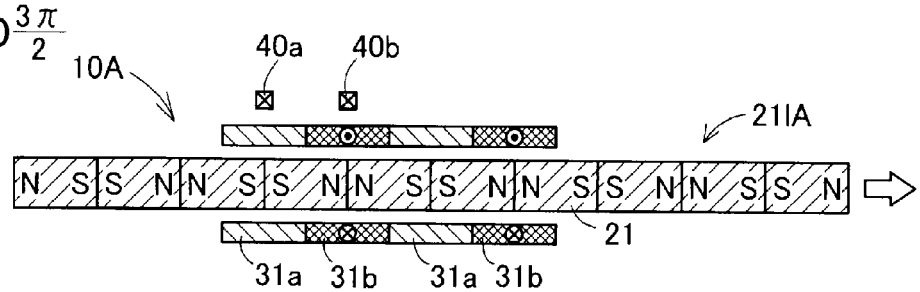

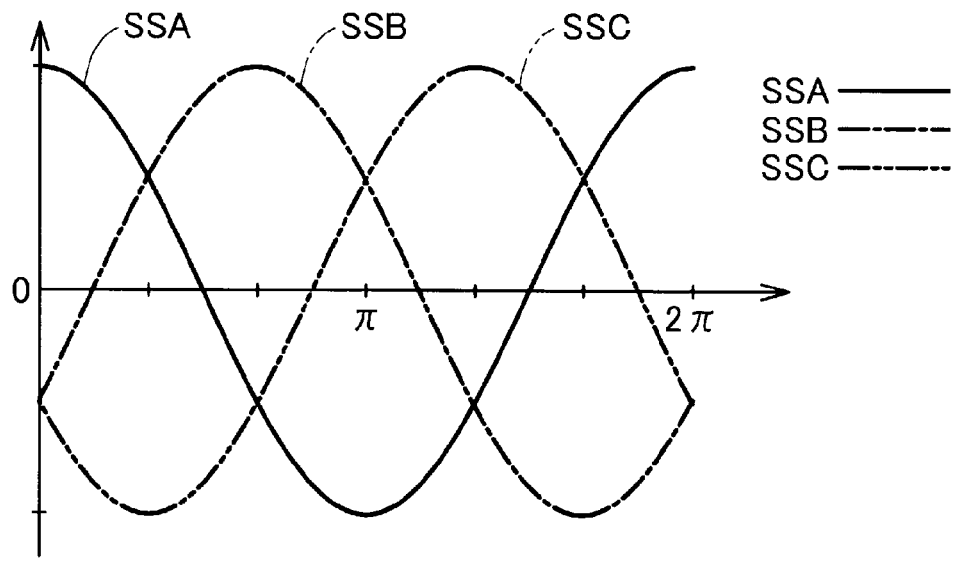
$$a = \cos(\omega t), \ b = \cos(\omega t - \frac{2\pi}{3}), \ c = \cos(\omega t - \frac{4\pi}{3})$$
$$\begin{bmatrix} \alpha \\ \beta \end{bmatrix} = \frac{2}{3} \begin{bmatrix} 1 & -1/2 & -1/2 \\ 0 & \sqrt{3}/2 & -\sqrt{3}/2 \end{bmatrix} \begin{bmatrix} a \\ b \\ c \end{bmatrix}$$
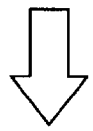
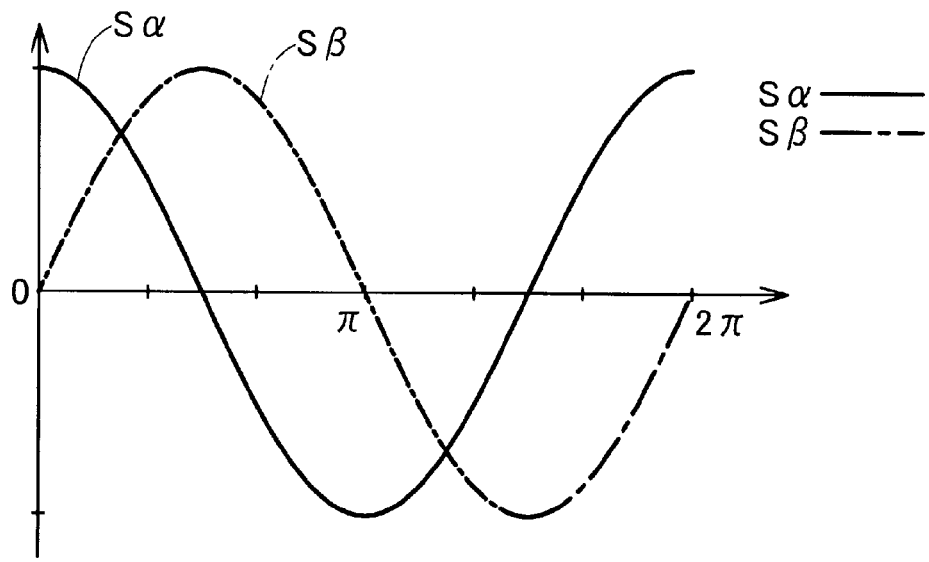
FIG.28

| θ | a | b | c | α | β |
|---|---|---|---|---|---|
| 0 | 1 | -0.5 | -0.5 | 1 | 3.701E-16 |
| 5 | 0.9961947 | -0.422618 | -0.573576 | 0.9961947 | 0.0871557 |
| 10 | 0.9848078 | -0.34202 | -0.642788 | 0.9848078 | 0.1736482 |
| 15 | 0.9659258 | -0.258819 | -0.707107 | 0.9659258 | 0.258819 |
| 20 | 0.9396926 | -0.173648 | -0.766044 | 0.9396926 | 0.3420201 |
| 25 | 0.9063078 | -0.087156 | -0.819152 | 0.9063078 | 0.4226183 |
| 30 | 0.8660254 | 6.126E-17 | -0.866025 | 0.8660254 | 0.5 |
| 35 | 0.819152 | 0.0871557 | -0.906308 | 0.819152 | 0.5735764 |
| 40 | 0.7660444 | 0.1736482 | -0.939693 | 0.7660444 | 0.6427876 |
| 45 | 0.7071068 | 0.258819 | -0.965926 | 0.7071068 | 0.7071068 |
| 50 | 0.6427876 | 0.3420201 | -0.984808 | 0.6427876 | 0.7660444 |
| 55 | 0.5735764 | 0.4226183 | -0.996195 | 0.5735764 | 0.819152 |
| 60 | 0.5 | 0.5 | -1 | 0.5 | 0.8660254 |
| 65 | 0.4226183 | 0.5735764 | -0.996195 | 0.4226183 | 0.9063078 |
| 70 | 0.3420201 | 0.6427876 | -0.984808 | 0.3420201 | 0.9396926 |
| 75 | 0.258819 | 0.7071068 | -0.965926 | 0.258819 | 0.9659258 |
| 80 | 0.1736482 | 0.7660444 | -0.939693 | 0.1736482 | 0.9848078 |
| 85 | 0.0871557 | 0.819152 | -0.906308 | 0.0871557 | 0.9961947 |
| 90 | 6.126E-17 | 0.8660254 | -0.866025 | 3.701E-17 | 1 |
| 95 | -0.087156 | 0.9063078 | -0.819152 | -0.087156 | 0.9961947 |
| 100 | -0.173648 | 0.9396926 | -0.766044 | -0.173648 | 0.9848078 |
| 105 | -0.258819 | 0.9659258 | -0.707107 | -0.258819 | 0.9659258 |
| 110 | -0.34202 | 0.9848078 | -0.642788 | -0.34202 | 0.9396926 |
| 115 | -0.422618 | 0.9961947 | -0.573576 | -0.422618 | 0.9063078 |
| 120 | -0.5 | 1 | -0.5 | -0.5 | 0.8660254 |
| 125 | -0.573576 | 0.9961947 | -0.422618 | -0.573576 | 0.819152 |
| 130 | -0.642788 | 0.9848078 | -0.34202 | -0.642788 | 0.7660444 |
| 135 | -0.707107 | 0.9659258 | -0.258819 | -0.707107 | 0.7071068 |
| 140 | -0.766044 | 0.9396926 | -0.173648 | -0.766044 | 0.6427876 |
| 145 | -0.819152 | 0.9063078 | -0.087156 | -0.819152 | 0.5735764 |
| 150 | -0.866025 | 0.8660254 | 6.126E-17 | -0.866025 | 0.5 |
| 155 | -0.906308 | 0.819152 | 0.0871557 | -0.906308 | 0.4226183 |
| 160 | -0.939693 | 0.7660444 | 0.1736482 | -0.939693 | 0.3420201 |
| 165 | -0.965926 | 0.7071068 | 0.258819 | -0.965926 | 0.258819 |
| 170 | -0.984808 | 0.6427876 | 0.3420201 | -0.984808 | 0.1736482 |
| 175 | -0.996195 | 0.5735764 | 0.4226183 | -0.996195 | 0.0871557 |
| 180 | -1 | 0.5 | 0.5 | -1 | 0 |
| 185 | -0.996195 | 0.4226183 | 0.5735764 | -0.996195 | -0.087156 |
| 190 | -0.984808 | 0.3420201 | 0.6427876 | -0.984808 | -0.173648 |
| 195 | -0.965926 | 0.258819 | 0.7071068 | -0.965926 | -0.258819 |
| 200 | -0.939693 | 0.1736482 | 0.7660444 | -0.939693 | -0.34202 |
| 205 | -0.906308 | 0.0871557 | 0.819152 | -0.906308 | -0.422618 |
| 210 | -0.866025 | 6.126E-17 | 0.8660254 | -0.866025 | -0.5 |
| 215 | -0.819152 | -0.087156 | 0.9063078 | -0.819152 | -0.573576 |
| 220 | -0.766044 | -0.173648 | 0.9396926 | -0.766044 | -0.642788 |
| 225 | -0.707107 | -0.258819 | 0.9659258 | -0.707107 | -0.707107 |
| 230 | -0.642788 | -0.34202 | 0.9848078 | -0.642788 | -0.766044 |
| 235 | -0.573576 | -0.422618 | 0.9961947 | -0.573576 | -0.819152 |
| 240 | -0.5 | -0.5 | 1 | -0.5 | -0.866025 |
| 245 | -0.422618 | -0.573576 | 0.9961947 | -0.422618 | -0.906308 |
| 250 | -0.34202 | -0.642788 | 0.9848078 | -0.34202 | -0.939693 |
| 255 | -0.258819 | -0.707107 | 0.9659258 | -0.258819 | -0.965926 |
| 260 | -0.173648 | -0.766044 | 0.9396926 | -0.173648 | -0.984808 |
| 265 | -0.087156 | -0.819152 | 0.9063078 | -0.087156 | -0.996195 |
| 270 | -1.84E-16 | -0.866025 | 0.8660254 | -1.11E-16 | -1 |
| 275 | 0.0871557 | -0.906308 | 0.819152 | 0.0871557 | -0.996195 |
| 280 | 0.1736482 | -0.939693 | 0.7660444 | 0.1736482 | -0.984808 |
| 285 | 0.258819 | -0.965926 | 0.7071068 | 0.258819 | -0.965926 |
| 290 | 0.3420201 | -0.984808 | 0.6427876 | 0.3420201 | -0.939693 |
| 295 | 0.4226183 | -0.996195 | 0.5735764 | 0.4226183 | -0.906308 |
| 300 | 0.5 | -1 | 0.5 | 0.5 | -0.866025 |
| 305 | 0.5735764 | -0.996195 | 0.4226183 | 0.5735764 | -0.819152 |
| 310 | 0.6427876 | -0.984808 | 0.3420201 | 0.6427876 | -0.766044 |
| 315 | 0.7071068 | -0.965926 | 0.258819 | 0.7071068 | -0.707107 |
| 320 | 0.7660444 | -0.939693 | 0.1736482 | 0.7660444 | -0.642788 |
| 325 | 0.819152 | -0.906308 | 0.0871557 | 0.819152 | -0.573576 |
| 330 | 0.8660254 | -0.866025 | 6.126E-17 | 0.8660254 | -0.5 |
| 335 | 0.9063078 | -0.819152 | -0.087156 | 0.9063078 | -0.422618 |
| 340 | 0.9396926 | -0.766044 | -0.173648 | 0.9396926 | -0.34202 |
| 345 | 0.9659258 | -0.707107 | -0.258819 | 0.9659258 | -0.258819 |
| 350 | 0.9848078 | -0.642788 | -0.34202 | 0.9848078 | -0.173648 |
| 355 | 0.9961947 | -0.573576 | -0.422618 | 0.9961947 | -0.087156 |
| 360 | 1 | -0.5 | -0.5 | 1 | -3.7E-16 |

FIG.29

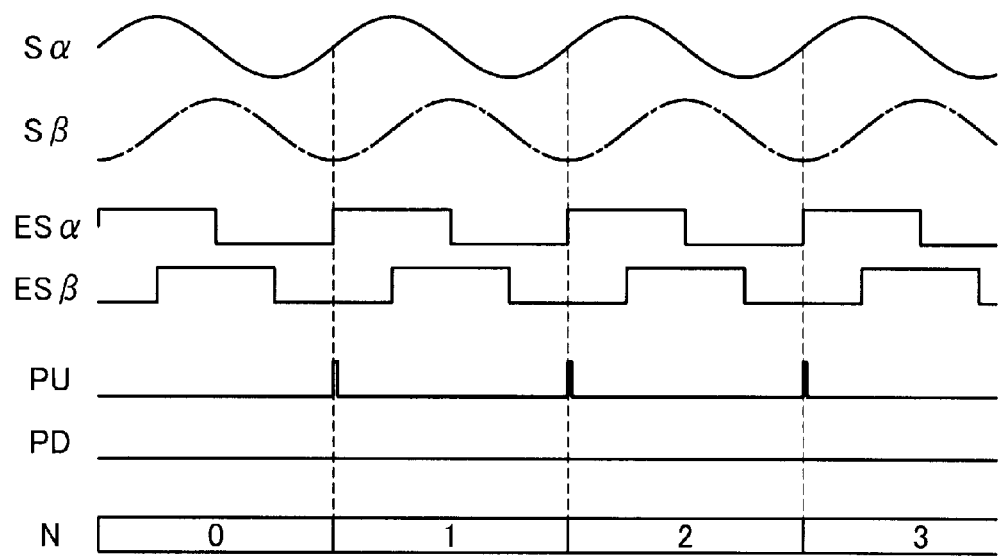
FIG.31A FORWARD MOVEMENT
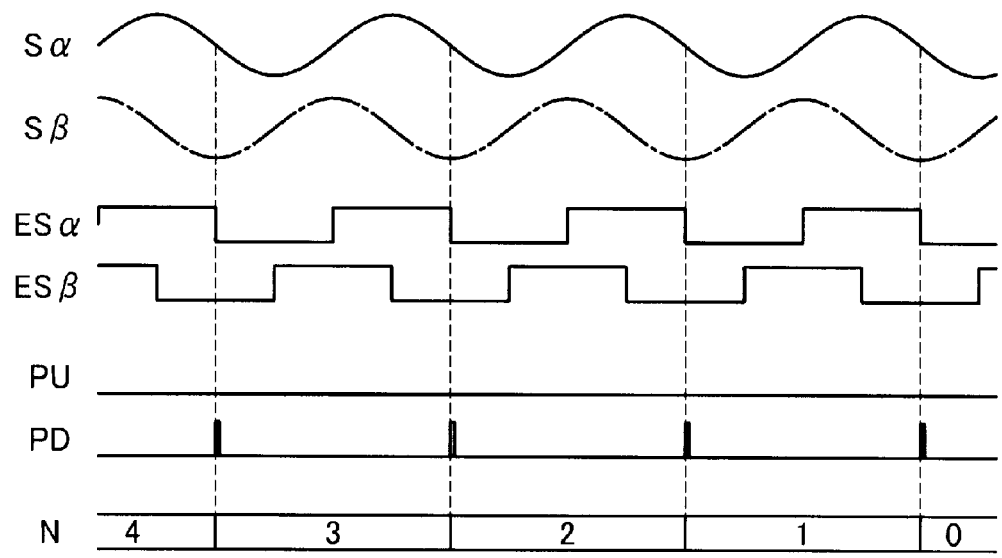
FIG.31B BACKWARD MOVEMENT

LINEAR MOTOR

BACKGROUND

1. Technical Field

The present invention relates to a linear motor.

2. Related Art

As a motor, a linear motor that linearly moves a movable element relative to a stator using electromagnetic force is known (Patent Document 1 (JP-A-2008-289344). In the linear motor, the movement of the movable element is controlled by detecting the change of magnetic flux due to movement of the movable element and controlling a magnetic field generated by an electromagnetic coil based on the change of magnetic flux. However, in the past, it has not been sufficient to make efforts to accurately detect the change of magnetic flux and improve the controllability of the linear motor.

SUMMARY

An advantage of some aspects of the invention is to provide a technology of improving the controllability of a linear motor.

Application Example 1

This application example of the invention is directed to a linear motor including a slider unit having a magnet row in which plural permanent magnets are arranged in series so that the same poles are opposed to each other and moving in an arrangement direction of the magnet row by electromagnetic force, a stator unit including electromagnetic coils for plural phases arranged along a movement direction of the slider unit and receiving supply of drive currents at different phases with respect to each phase, and plural magnetic detector devices that detect changes of magnetic flux with movement of the magnetic raw for controlling movement of the slider unit, wherein the plural magnetic detector devices are provided in response to the phases of the electromagnetic coils for plural phases and arranged along the movement direction of the slider unit at an outer circumferential side of the electromagnetic coils for plural phases, and thereby, detect magnetic flux radially extending in a direction perpendicular to the arrangement direction of the permanent magnets at boundaries between the permanent magnets of the magnet row and output signal waveforms for plural phases at phases equal to phases of waveforms of back electromotive forces generated in the respective electromagnetic coils for plural phases when the magnet row moves.

According to the linear motor, since the plural magnetic detector devices detect the magnetic flux radially extending in the direction perpendicular to the arrangement direction of the permanent magnets in the magnet row, the detection accuracy of the changes of the magnetic flux by the plural magnetic detector devices is improved. Further, since the plural magnetic detector devices output the signal waveforms at the phases equal to the phases of the waveforms of the back electromotive forces generated in the electromagnetic coils for the respective phases with the movement of the magnet row, the control of the movement of the slider unit may be executed more appropriately and the controllability of the linear motor is improved.

Application Example 2

This application example of the invention is directed to the linear motor according to application example 1, which further includes a control unit that controls drive signals of the linear motor based on output signals for at least two phases output by the plural magnetic detector devices and detects a position of the slider unit for controlling the position of the slider unit.

According to the linear motor, the drive signals are controlled based on the output signals of the magnetic detector devices corresponding to the phases of the electromagnetic coils. Further, the position of the slider unit may be detected with high accuracy based on the output signals of the magnetic detector devices. Therefore, the controllability of the linear motor is improved.

Application Example 3

This application example of the invention is directed to the linear motor according to application example 2, wherein the electromagnetic coils for plural phases are electromagnetic coils for three phases, the plural magnetic detector devices output signal waveforms for three phases corresponding to the electromagnetic coils for three phases, and the control unit transforms the signal waveforms for three phases into signal waveforms for two phases corresponding to positions of the boundaries between the permanent magnets in the magnet row and detects the position of the slider unit based on the signal waveforms for two phases.

According to the linear motor, the electromagnetic coils for three phases may be controlled based on the signals for three phases output from the plural magnetic detector devices. Further, the signals for three phases output by the plural magnetic detector devices are transformed into the signals for two phases corresponding to the position of the magnet row, and thereby, position detection of the slider unit becomes easier. Therefore, the controllability of the linear motor is further improved.

Application Example 4

This application example of the invention is directed to the linear motor according to any one of application examples 1 to 3, wherein a back yoke is provided between the plural magnetic detector devices and the electromagnetic coils for plural phases, and plural slits along the movement direction of the slider unit are formed in the back yoke.

According to the linear motor, the magnetic efficiency of the electromagnetic coils is improved by the back yoke and the generation region of eddy currents is divided by the slits, and thereby, eddy-current loss in the back yoke is reduced.

The application examples of the invention can be realized in various forms and may be realized in forms of a linear motor, an actuator or a manipulator including the linear motor, a control method of the linear motor, or the like, for example.

BRIEF DESCRIPTION OF THE DRAWINGS

The invention will be described with reference to the accompanying drawings, wherein like numbers reference like elements.

FIGS. 4A and 4B are explanatory diagrams for explanation of relationships between back electromotive forces generated in the electromagnetic coils and sensor outputs of the position detection sensors.

FIGS. 5A to 5C are schematic diagrams showing a configuration of a linear motor of a comparative example.

FIGS. 7A to 7E are explanatory diagrams showing an internal configuration and operations of a PWM control part.

FIGS. 8A to 8F are explanatory diagrams showing correspondence relationships between waveforms of sensor outputs and waveforms of drive signals generated in a PWM part.

FIGS. 19A and 19B are explanatory diagrams showing changes of count values in response to changes of the respective signals.

FIGS. 21A to 21D are explanatory diagrams for explanation of control of currents in the linear motor and movement of the slider in response to the control.

FIG. 28 is an explanatory diagram for explanation of an example of three-phase to two-phase transformation of transforming signal waveforms for three phases as sensor outputs of position detection sensors for three phases into signal waveforms for two phases.

FIG. 29 is an explanatory diagram for explanation of the example of three-phase to two-phase transformation of transforming signal waveforms for three phases as sensor outputs of position detection sensors for three phases into signal waveforms for two phases.

FIGS. 31A and 31B are explanatory diagrams showing changes of count values in response to changes of the respective signals.

DESCRIPTION OF EXEMPLARY EMBODIMENTS

A. First Embodiment

A1. Configuration of Linear Motor

Figures 1A, 1B:
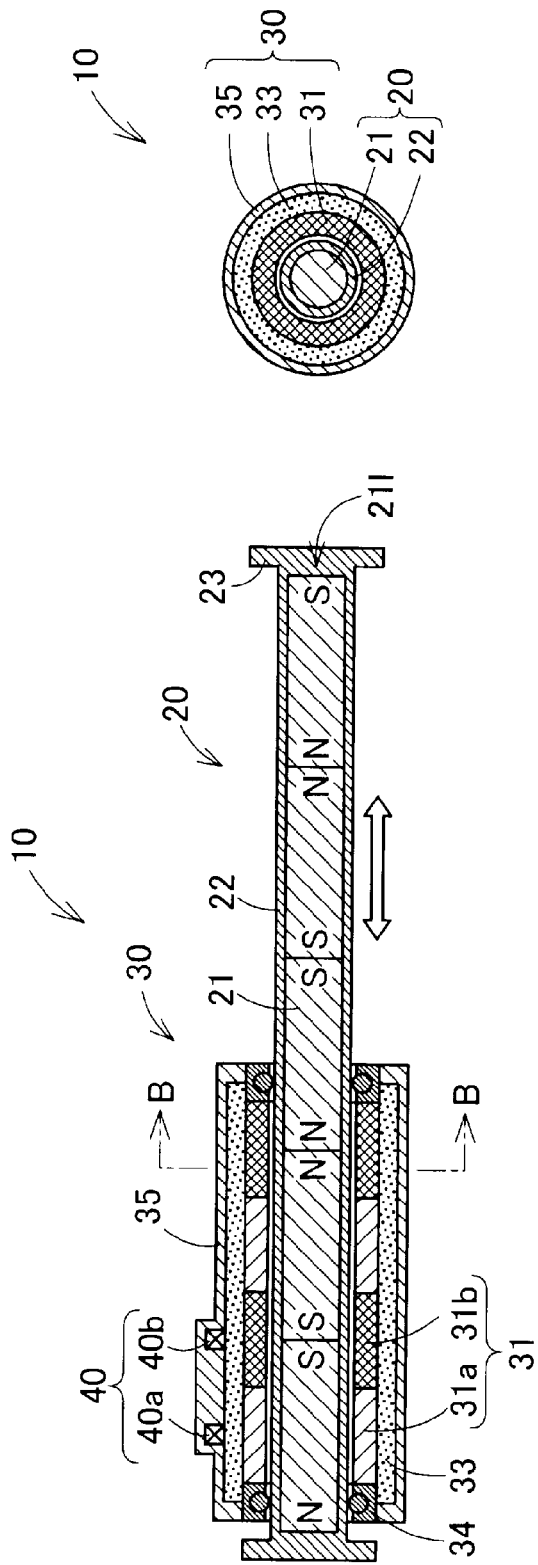
FIGS. 1A and 1B are schematic diagrams showing a configuration of a linear motor.

FIGS. 1A and 1B are schematic diagrams showing a configuration of a linear motor 10 as one embodiment of the invention. FIG. 1A is a schematic sectional view of the linear motor 10 seen from the side surface side. FIG. 1B is a schematic sectional view of the linear motor 10 along B-B section.

The linear motor 10 includes a movable element 20 in a nearly straight rod shape (also referred to as "slider 20") and a stator 30 in a nearly cylindrical shape. The slider 20 is inserted into the stator 30 to reciprocate along the center axis direction of itself (shown by a hollow arrow).

The slider 20 includes a casing 22 in a nearly cylindrical shape with closed ends and a magnet row 211 contained within the casing 22. The magnet row 211 is a magnet device in which plural permanent magnets 21 are arranged in series so that the same poles are opposed to each other. Note that, in FIG. 1A, "N", "S" indicating an N-pole and an S-pole are shown with respect to each permanent magnet 21.

In the slider 20, according to the arrangement configuration of the permanent magnets 21, magnetic flux radially spreading in a direction perpendicular to the movement direction of the slider 20 (the arrangement direction of the permanent magnets 21) is formed at boundaries between end surfaces of the permanent magnets 21. In end parts of the slider 20, flange parts 23 projecting in the radial directions of the end surfaces are formed. The flange parts 23 function as stoppers for preventing the slider 20 from dropping off from the stator 30.

The stator 30 includes four electromagnetic coils 31, a coil back yoke 33, two shaft bearings 34, a casing 35, and a position detection sensor 40. In the linear motor 10 of the embodiment, the four electromagnetic coils 31 are arranged in series on the outer circumference of the slider 20 along the movement direction of the slider 20 with an air gap between the outer surface of the slider 20 and itself. Note that conducting wires of the respective electromagnetic coils 31 are wound along the circumferential direction of the slider 20.

Here, the respective four electromagnetic coils 31 are divided into A-phase electromagnetic coils 31$a$ and B-phase electromagnetic coils 31$b$ to which currents at different phases are applied. In FIG. 1A, the A-phase electromagnetic coil 31$a$ and the B-phase electromagnetic coil 31$b$ are shown in distinction by different hatchings.

The A-phase electromagnetic coils 31$a$ and the B-phase electromagnetic coils 31$b$ are alternately arranged along the movement direction of the slider 20. Here, in the linear motor 10 of the embodiment, the arrangement pitch of the A-phase electromagnetic coils 31a and the B-phase electromagnetic coils 31b is nearly a half of the arrangement pitch of the permanent magnets 21 in the magnet row 211.

In the specification, the A-phase electromagnetic coil 31a on the left side of the paper is referred to as "first A-phase electromagnetic coil 31a" and the A-phase electromagnetic coil 31a on the right side of the paper is referred to as "second A-phase electromagnetic coil 31a". Further, similarly, the B-phase electromagnetic coil 31b on the left side of the paper is referred to as "first B-phase electromagnetic coil 31b" and the B-phase electromagnetic coil 31b on the right side of the paper is referred to as "second B-phase electromagnetic coil 31b". Control of electromagnetic forces in the respective A-phase electromagnetic coils 31a and B-phase electromagnetic coils 31b will be described later.

The coil back yoke 33 is provided to cover the entire outer circumferential surfaces of the four electromagnetic coils 31, and improves the magnetic efficiency of the four electromagnetic coils 31. The coil back yoke 33 may be formed using JNEX core or JNHF core of JFE Steel, for example. The shaft bearings 34 are respectively provided in opening parts on the ends of the stator 30 to slidably hold the slider 20.

The casing 35 is a container having a nearly cylindrical shape opening at the ends. In the internal space of the casing 35, the above described electromagnetic coils 31, coil back yoke 33, and shaft bearings 34 are contained. Further, in the linear motor 10 of the embodiment, the position detection sensor 40 for detecting changes of magnetic flux with movement of the slider 20 is contained in the internal space of the casing 35.

The position detection sensor 40 includes an A-phase position detection sensor 40a and a B-phase position detection sensor 40b provided in correspondence with the respective phases of the electromagnetic coils 31. The A-phase position detection sensor 40a and the B-phase position detection sensor 40b output voltages nearly linearly corresponding to back electromotive forces generated in the A-phase electromagnetic coils 31a and the B-phase electromagnetic coils 31b, respectively. The details of correlations between the back electromotive forces in the electromagnetic coils 31 and the output of the A-phase position detection sensor 40a will be described later.

In the linear motor 10 of the embodiment, the A-phase position detection sensor 40a and the B-phase position detection sensor 40b are respectively provided in the following positions outside of the coil back yoke 33. That is, the A-phase position detection sensor 40a is provided in the center position of the winding width of the first A-phase electromagnetic coil 31a, and the second B-phase position detection sensor 40b is provided in the center position of the winding width of the B-phase electromagnetic coil 31b.

FIGS. 2A to 2D are schematic diagrams for explanation of control of currents for the respective electromagnetic coils 31 and movement of the slider 20 in response to the control. FIGS. 2A to 2D show the slider 20 moving in a direction shown by a hollow arrow (rightward on the paper) in a stepwise manner. In FIGS. 2A to 2D, illustrations of the magnet row 211 and the A-phase and B-phase electromagnetic coils 31a, 31b and the respective component parts of the linear motor 10 other than the position detection sensor 40 are omitted. Further, in FIGS. 2A to 2D, arrows indicating the directions of the currents flowing in the respective electromagnetic coils 31 are shown on the respective electromagnetic coils 31.

Figure 2A:
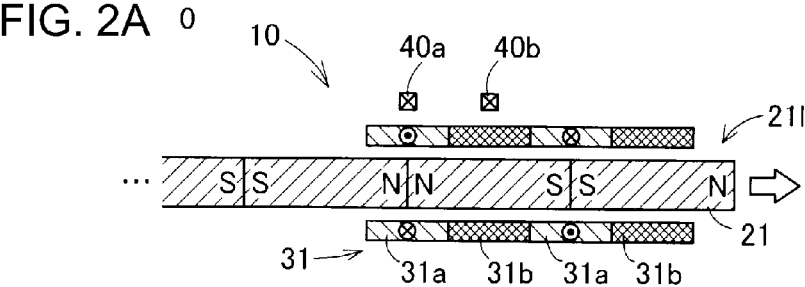
FIGS. 2A to 2D are schematic diagrams for explanation of control of currents for electromagnetic coils and movement of a slider in response to the control.

FIG. 2A shows a state in which the boundary of the permanent magnets 21 at which N-poles are opposed is located in the position of the first A-phase electromagnetic coil 31a and the boundary of the permanent magnets 21 at which S-poles are opposed is located in the position of the second A-phase electromagnetic coil 31a. When the slider 20 is in the position, the currents in the opposite directions are respectively supplied to the two A-phase electromagnetic coils 31a. Specifically, when the linear motor 10 is seen along the movement direction of the slider 20, the clockwise current is allowed to flow in the first A-phase electromagnetic coil 31a and the counter-clockwise current is allowed to flow in the second A-phase electromagnetic coil 31a. By the current control, the slider 20 moves in the arrow direction according to the electromagnetic forces of the two A-phase electromagnetic coils 31a.

Figure 2B:
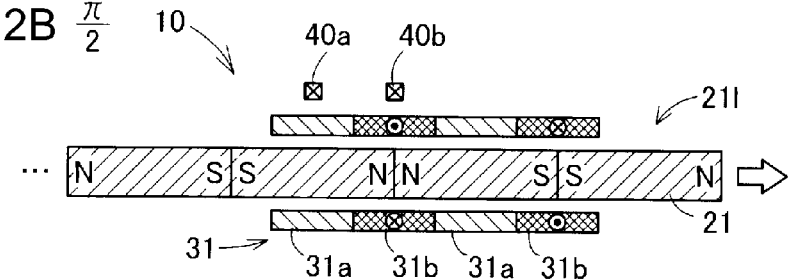

FIG. 2B shows a state in which the boundary of the permanent magnets 21 at which N-poles are opposed is located in the position of the first B-phase electromagnetic coil 31b and the boundary of the permanent magnets 21 at which S-poles are opposed is located in the position of the second B-phase electromagnetic coil 31b. In this regard, when the linear motor 10 is seen along the movement direction of the slider 20, the clockwise current is allowed to flow in the first B-phase electromagnetic coil 31b and the counter-clockwise current is allowed to flow in the second B-phase electromagnetic coil 31b. By the current control, the slider 20 further moves in the arrow direction according to the electromagnetic forces of the two B-phase electromagnetic coils 31b.

Figure 2C:
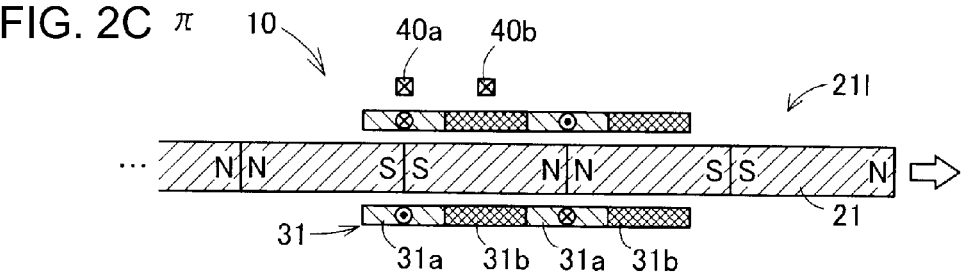

FIG. 2C shows a state in which the boundary of the permanent magnets 21 at which S-poles are opposed is located in the position of the first A-phase electromagnetic coil 31a and the boundary of the permanent magnets 21 at which N-poles are opposed is located in the position of the second A-phase electromagnetic coil 31a. In this regard, the currents in the opposite directions to those in FIG. 2A are allowed to flow in the respective two A-phase electromagnetic coils 31a. The slider 20 further moves in the arrow direction according to the electromagnetic forces of the two A-phase electromagnetic coils 31a.

Figure 2D:
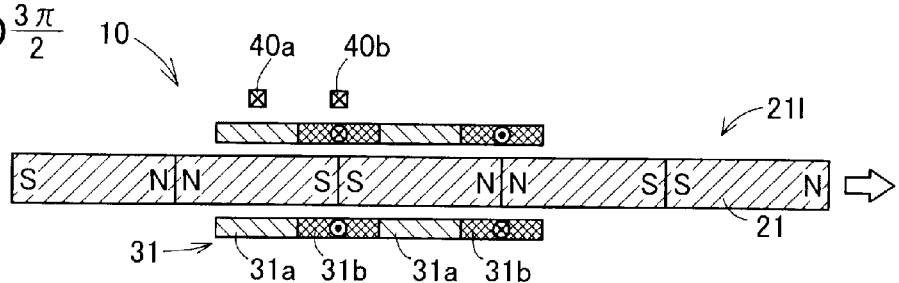

FIG. 2D shows a state in which the boundary of the permanent magnets 21 at which S-poles are opposed is located in the position of the first B-phase electromagnetic coil 31b and the boundary of the permanent magnets 21 at which N-poles are opposed is located in the position of the second B-phase electromagnetic coil 31b. In this regard, the currents in the opposite directions to those in FIG. 2B are allowed to flow in the respective two B-phase electromagnetic coils 31b. By the current control, the slider 20 further moves in the arrow direction according to the electromagnetic forces of the two B-phase electromagnetic coils 31b. Note that, when the slider 20 is moved in the opposite direction, the currents are supplied to the respective electromagnetic coils 31 in the reverse order that has been explained in FIGS. 2A to 2D.

Here, as described above, the position detection sensors 40a, 40b for two phases detect changes of magnetic flux with movement of the slider 20. As below, the configuration of the position detection sensor 40 will be explained and the outputs of the position detection sensors 40a, 40b for two phases when the slider 20 moves as explained in FIGS. 2A to 2D will be explained.

Figure 3A:
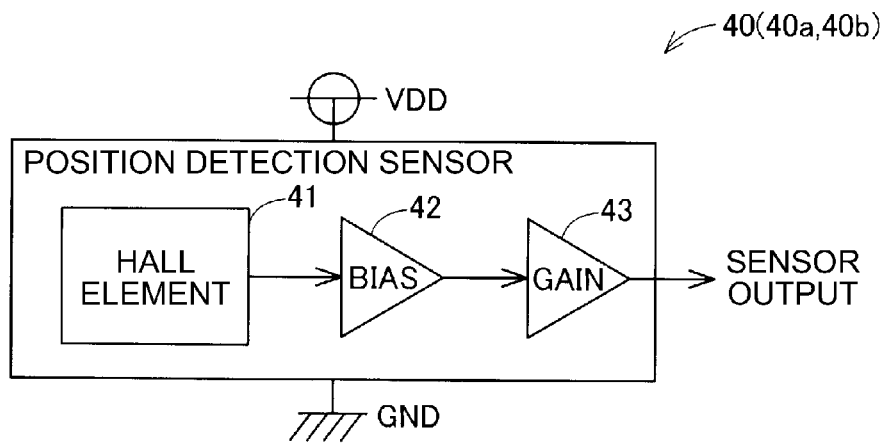
FIGS. 3A to 3C are schematic diagrams showing an example of an internal configuration of a position detection sensor.

FIG. 3A is a schematic diagram showing an example of an internal configuration of the position detection sensor 40. The position detection sensor 40 has a configuration in which a Hall element 41, a bias adjustment part 42, and a gain adjustment part 43 are connected in series. The Hall element 41 measures magnetic flux density. The bias adjustment part 42 adds a bias value to the output of the Hall element 41. The gain adjustment part 43 multiplies the output value of the bias adjustment part 42 by a gain value. Note that, in the position detection sensor 40, by setting these gain value and bias value to appropriate values, the output (sensor output) of the position detection sensor 40 can be calibrated to a preferable waveform.

Figure 3B:
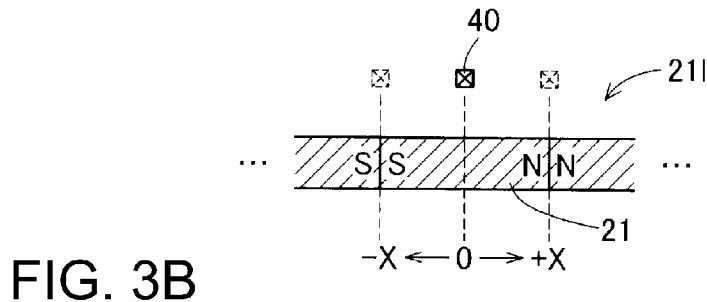
Figure 3C:
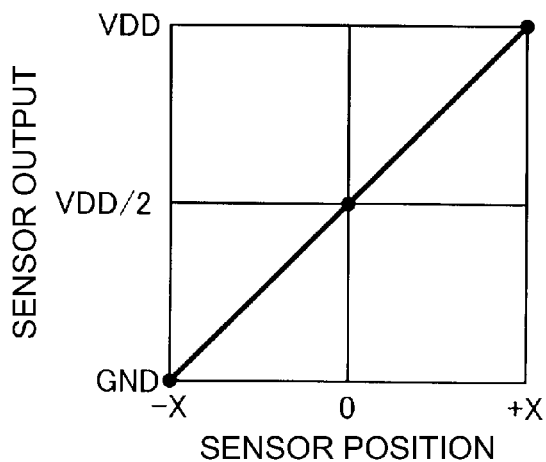

FIGS. 3B and 3C are explanatory diagrams for explanation of a relationship between the position of the position detection sensor 40 relative to the magnet row 211 (hereinafter, referred to as "sensor position") and the sensor output. FIG. 3B shows a schematic diagram for explanation of the sensor position. FIG. 3B shows an arbitrary permanent magnet 21 sandwiched between two permanent magnets 21 in the magnet row 211 and the position detection sensor 40.

Here, the origin of the sensor position is set to the center position in the permanent magnet 21. Further, regarding the sensor position, the position of the boundary at which the N-poles are opposed in the magnet row 211 is indicated by +X and the position of the boundary at which the S-poles are opposed is indicated by −X.

FIG. 3C shows a graph with a horizontal axis of the sensor position and a vertical axis of the sensor output. The sensor output of the position detection sensor 40 is represented by a linear graph to indicate GND (ground potential) when the sensor position is −X and VDD when the sensor position is +X. When the sensor position is "0", the sensor output is VDD/2.

FIGS. 4A and 4B are explanatory diagrams for explanation of relationships between the back electromotive forces generated in the respective electromagnetic coils 31 and the sensor output of the position detection sensor 40. FIG. 4A is a graph showing the change of the back electromotive force generated in the A-phase electromagnetic coil 31a, the change of the output of the Hall element 41 in the A-phase position detection sensor 40a, and the change of the sensor output of the A-phase position detection sensor 40a.

FIG. 4A shows a graph of the back electromotive forces of the A-phase electromagnetic coil 31a in the upper part by a solid line, a graph of the output of the Hall element 41 of the A-phase position detection sensor 40a in the middle part by a broken line, and a graph of the sensor output of the A-phase position detection sensor 40a in the lower part by a dot-dash line. Note that the positional relationships between the magnet row 211 and the A-phase position detection sensor 40a at electrical angles of 0, π/2, π, 3π/2, 2π indicated on the horizontal axis of FIG. 4A are the positional relationships shown in FIGS. 2A to 2D.

In the linear motor 10, when the slider 20 is linearly moved at a constant speed, the change of the back electromotive force of the A-phase electromagnetic coil 31a (−Et to +Et [V]) exhibits a waveform near sine wave and its amplitude increases with the increase of the movement speed of the slider 20. Note that, in the upper part of FIG. 4A, traces when the amplitude of the waveform of the back electromotive force of the A-phase electromagnetic coil 31a increases with the increase of the movement speed of the slider 20 are shown by plural broken lines in a stepwise manner.

Here, as described above, the A-phase position detection sensor 40a is provided at the center of the winding width of the A-phase electromagnetic coil 31a on the outer circumference of the A-phase electromagnetic coil 31a. Thereby, when the back electromotive force of the A-phase electromagnetic coil 31a exhibits the change near the sine wave as described above, the output signal of the Hall element 41 of the A-phase position detection sensor 40a is a waveform signal having a similarity shape at an equal phase to that of the waveform indicating the change of the back electromotive force of the A-phase electromagnetic coil 31a. Further, the output signal of the A-phase position detection sensor 40a is the waveform signal that exhibits the similar change to that of the output of the Hall element 41. In the drawing, the range of the amplitude of the output signal of the Hall element 41 is from −SV to +SV [V] and the range of the amplitude of the output signal of the A-phase position detection sensor 40a is from 0 to +VDD [V].

FIG. 4B is a graph showing the change of the back electromotive force in the B-phase electromagnetic coil 31b, the change of the output of the Hall element 41 in the B-phase position detection sensor 40b, and the change of the sensor output of the B-phase position detection sensor 40b. FIG. 4B is nearly the same as FIG. 4A except that the phases of the shown waveforms are different.

In the linear motor 10, when the slider 20 is linearly moved at a constant speed as explained in FIGS. 2A to 2D, the change of the back electromotive force in the B-phase electromagnetic coil 31b is delayed in phase by π/2 relative to that of the change of the back electromotive force in the A-phase electromagnetic coil 31a (FIG. 4A). The B-phase position detection sensor 40b is provided at the center of the winding width of the B-phase electromagnetic coil 31b on the outer circumference of the B-phase electromagnetic coil 31b. Therefore, both the output signal of the Hall element 41 in the B-phase position detection sensor 40b and the output signal of the B-phase position detection sensor 40b are waveform signals having similarity shapes at equal phases to that of the waveform indicating the change of the back electromotive force of the B-phase electromagnetic coil 31b.

That is, the output signal of the B-phase position detection sensor 40b is a waveform delayed in phase by π/2 relative to the output signal of the A-phase position detection sensor 40a. Note that, when the slider 20 is linearly moved at a constant speed in the opposite direction to that as explained in FIGS. 2A to 2D, the output signal of the A-phase position detection sensor 40a takes a waveform delayed in phase by π/2 relative to the output signal of the B-phase position detection sensor 40b.

As understood from the above explanation, the movement direction and the movement speed of the slider 20 and the position of the slider 20 can be detected from the waveforms of the output signals of the A-phase position detection sensors 40a, 40b for two phases. Further, by controlling the application voltages to the electromagnetic coils 31a, 31b for the respective phases based on the sensor outputs of the A-phase position detection sensors 40a, 40b for two phases, the drive efficiency of the linear motor 10 may be improved. That is, in the linear motor 10, by improving the detection accuracy of the changes of magnetic flux using the A-phase position detection sensors 40a, 40b for two phases, its controllability can be improved.

FIGS. 5A and 5B are schematic diagrams showing a configuration of a linear motor 10a as a comparative example of the invention. FIGS. 5A and 5B are nearly the same as FIGS. 1A and 1B except that a position detection part 45 is provided outside of the stator 30 in place of the two position detection sensors 40a, 40b of the stator 30.

In the linear motor 10a of the comparative example, the position detection part 45 is provided outside of one opening part of the stator 30. The position detection part 45 is a magnetic sensor device that can output a similar waveform to the waveforms of the back electromotive forces in the A-phase electromagnetic coil 31a and the B-phase electromagnetic coil 31b, and may include a resolver, for example. In this manner, also, in the linear motor 10a of the comparative example, by executing the control of the application voltages to the electromagnetic coils 31 using the output waveforms of the position detection part 45, its drive efficiency may be improved. However, in the position detection part 45 of the comparative example, there are the following problems.

FIG. 5C is a schematic diagram showing a state in which the flange part 23 as a stopper of the slider 20 reaches the end of the position detection part 45 and driving of the linear motor 10a of the comparative example is stopped. As described above, the position detection part 45 is provided outside of the opening part of the stator 30. Accordingly, the position detection part 45 detects the magnetic flux at the end of the magnet row 211 in the neighborhood of the flange part 23 of the slider 20.

Here, the magnetic flux at the end of the magnet row 211 is not formed to radially spread in the direction perpendicular to the center axis of the slider 20 unlike that at the boundary between the permanent magnets 21. That is, the change of magnetic flux at the end of the magnet row 211 becomes more unstable than the change of magnetic flux at the boundary between the permanent magnets 21. Therefore, in the neighborhood of the flange part 23 of the slider 20, the detection accuracy of the change of magnetic flux by the position detection part 45 becomes lower. Further, in the linear motor 10a of the comparative example, the movement range of the slider 20 is narrower by the size of the position detection part 45.

However, in the linear motor 10 of the embodiment, only the changes of magnetic flux at the boundaries between the permanent magnets 21 in the magnet row 211 are detected by the two A-phase position detection sensors 40a, 40b. Therefore, the detection accuracy of the changes of magnetic flux by the two A-phase position detection sensors 40a, 40b is improved compared to the case of the linear motor 10a of the comparative example. That is, the linear motor 10 of the embodiment is improved in controllability compared to the linear motor 10a of the comparative example. Further, the movement range of the slider 20 is larger than that of the linear motor 10a of the comparative example by the amount without the position detection part 45 provided outside of the opening part of the stator 30.

A2. Control of Linear Motor

Figure 6:
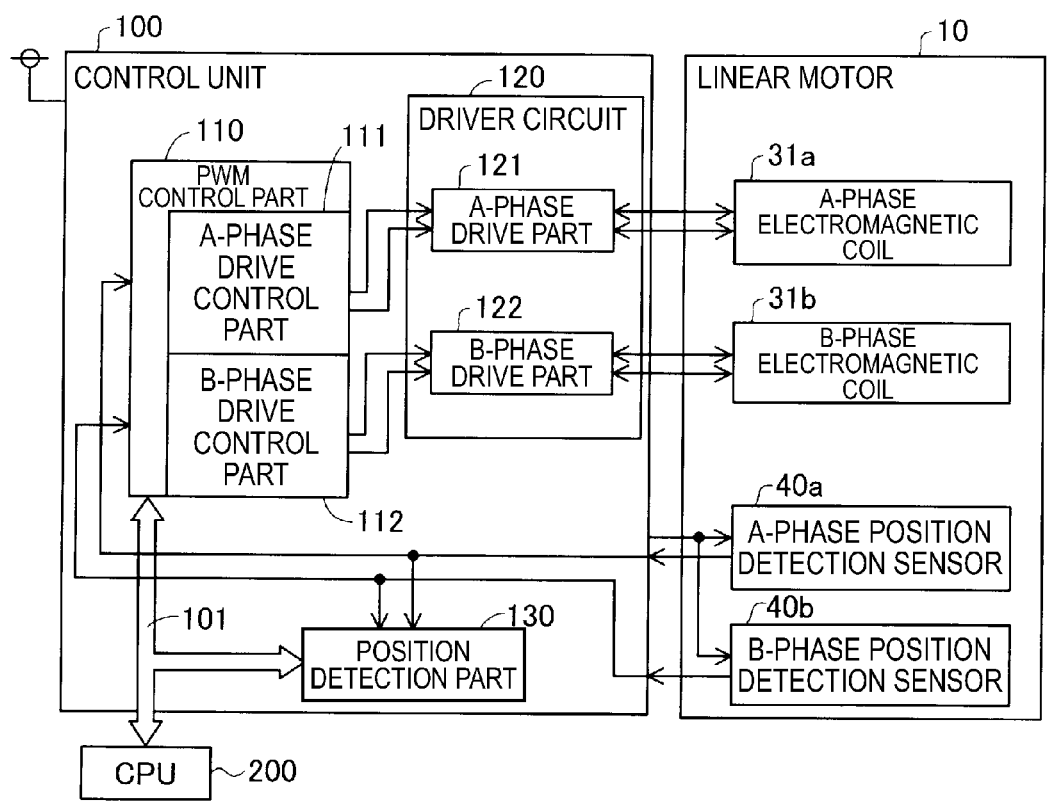
FIG. 6 is a schematic diagram showing a configuration of a control unit controlling the linear motor.

FIG. 6 is a schematic block diagram showing a configuration of a control unit 100 controlling the linear motor 10 of the embodiment. The control unit 100 controls the linear motor 10 by PWM control using the sensor outputs of the position detection sensors 40a, 40b for two phases. Further, the control unit 100 detects the relative position of the slider 20 to the stator 30 using the sensor outputs of the position detection sensors 40a, 40b for two phases, and uses it for position control of the slider 20. The control unit 100 includes a PWM control part 110, a driver circuit 120, and a position detection part 130.

The PWM control part 110 and the position detection part 130 are connected to a CPU 200 provided outside of the control unit 100 via a bus 101. Further, the PWM control part 110 and the position detection part 130 are connected to the respective position detection sensors 40a, 40b for two phases of the linear motor 10 via signal lines. The PWM control part 110 has an A-phase drive control part 111 and a B-phase drive control part 112.

The PWM control part 110 drives the A-phase electromagnetic coil 31a or the B-phase electromagnetic coil 31b of the linear motor 10 via the driver circuit 120 according to a command from the external CPU 200. The driver circuit 120 is a bridge circuit having plural switching elements. The driver circuit 120 has an A-phase drive part 121 that drives the A-phase electromagnetic coil 31a and a B-phase drive part 122 that drives the B-phase electromagnetic coil 31b.

Note that, when the A-phase electromagnetic coil 31a and the B-phase electromagnetic coil 31b are driven, the PWM control part 110 and the position detection part 130 receive the sensor outputs from the A-phase position detection sensor 40a and the B-phase position detection sensor 40b. The two position detection sensors 40a, 40b are driven according to a command from the control unit 100.

A2-1. PWM Control

FIGS. 7A to 7E are explanatory diagrams showing an internal configuration and an operation of the PWM control part 110. The PWM control part 110 includes a basic clock generator circuit 510, a 1/N divider 520, a PWM part 530, a forward/backward direction indicator value register 540. Further, the PWM control part 110 includes two multipliers 550, 552, coding parts 560, 562, AD conversion parts 570, 572, a voltage command value register 580, and an excitation section setting part 590.

The basic clock generator circuit 510 is a circuit that generates a clock signal PCL having a predetermined frequency, and includes a PLL circuit, for example. The 1/N divider 520 generates a clock signal SDC having a 1/N frequency of that of the clock signal PCL. The value N is previously set to a predetermined constant value by the CPU 200.

The PWM part 530 receives multiplication values Ma, Mb from the multipliers 550, 552, and receives a forward/backward direction indicator value RI from the forward/backward direction indicator value register 540. Further, the PWM part 530 receives positive/negative code signals Pa, Pb from the coding parts 560, 562, and receives excitation section signals Ea, Eb supplied from the excitation section setting part 590.

The PWM part 530 generates alternating-current drive signals DRVA1, DRVA2, DRVB1, DRVB2 in response to the clock signals PCL, SDC, the multiplication values Ma, Mb, the forward/backward direction indicator value RI, the positive/negative code signals Pa, Pb, and the excitation section signals Ea, Eb. The drive signals DRVA1, DRVA2 are drive signals for A-phase and the drive signals DRVB1, DRVB2 are drive signals for B-phase. The generation operation of the drive signals DRVA1, DRVA2, DRVB1, DRVB2 will be described later.

Within the forward/backward direction indicator value register 540, the value RI indicating the movement direction of the slider 20 is set by the CPU 200. Note that, in the embodiment, when the forward/backward direction indicator value RI is at the L-level, the slider 20 moves toward the right on the paper in FIG. 1A and, when the value is at the H-level, the slider 20 moves in the opposite direction. Hereinafter, the movement when the forward/backward direction indicator value RI is at the L-level is referred to as "forward movement" and the movement when the forward/backward direction indicator value RI is at the H-level is referred to as "backward movement".

The other signals Ma, Mb, Pa, Pb, Ea, Eb supplied to the PWM part 530 are determined in the following manner. Note that the multiplier 550, the coding part 560, and the AD conversion part 570 form a circuit for A-phase, and the multiplier 552, the coding part 562, and the AD conversion part 572 form a circuit for B-phase. The operations of the group of circuits are the same, and the operation of the circuit for A-phase will be mainly explained as below.

Note that, in the specification, when the A-phase and the B-phase are collectively referred to, suffixes "a" and "b" (showing the A-phase and the B-phase) of signs are omitted.

For example, when it is unnecessary to distinguish the multiplication values Ma, Mb for A-phase and B-phase, they are collectively referred to as "multiplication value M". The other signs are similar in reference. Further, as below, parameters for A-phase and B-phase (excitation sections etc., which will be described later) will be explained to be set to the same values, however, the parameters for A-phase and B-phase can be set to different values from each other.

The output SSA of the A-phase position detection sensor 40a is supplied to the AD conversion part 570. Note that, as has been explained in FIG. 3B, the range of the sensor output SSA is from GND (ground potential) to VDD (power supply voltage), for example, and their medium point (=VDD/2) is the medium point of the output waveform (the point passing through the origin of the sine wave).

The AD conversion part 570 AD-converts the sensor output SSA and generates a digital value of the sensor output. The range of the output of the AD conversion part 570 is from FFh to 0h (the last letter "h" expresses hexadecimal), for example, the median value at the positive side is set to 80h and the median value at the negative side is set to 7Fh, and they are respectively brought into correspondences with the medium points of the waveforms.

The coding part 560 converts the range of the sensor output values after AD conversion and sets the value of the medium point of the sensor output value to zero. As a result, the sensor output value Xa generated in the coding part 560 takes values in a predetermined range at the positive side (for example, from +127 to 0) and a predetermined range at the negative side (for example, from 0 to −127). Note that the value supplied from the coding part 560 to the multiplier 550 is an absolute value of the sensor output value Xa and its positive or negative sign is supplied as a positive/negative sign signal Pa to the PWM part 530.

The voltage command value register 580 stores a voltage command value Ya set by the CPU 200. The voltage command value Ya functions as a value for setting an application voltage to the linear motor 10 with an excitation section signal Ea, which will be described later. The voltage command value Ya typically takes a value from 0.0 to 1.0, however, a larger value than 1.0 may be set thereto. As below, it will be assumed that the voltage command value Ya takes a value in a range from 0.0 to 1.0.

In this regard, if the excitation section signal Ea is set so that all sections may be excitation sections without any non-excitation section, Ya=0 means that the application voltage is set to zero and Ya=1.0 means that the application voltage is set to the maximum value. The multiplier 550 multiplies the sensor output value Xa output from the coding part 560 by the voltage command value Ya into an integer number, and the multiplication value Ma is supplied to the PWM part 530.

FIGS. 7B to 7E show operations of the PWM part 530 when the multiplication value Ma takes various values. Here, it is assumed that all sections are excitation sections without any non-excitation section. The PWM part 530 is a circuit that generates one pulse with a duty of Ma/N in one period of the clock signal SDC. That is, as shown in FIGS. 7B to 7E, as the multiplication value Ma increases, the duties of the pulses of the drive signals DRVA1, DRVA2 increase.

Note that the first drive signal DRVA1 is a signal that generates a pulse only when the sensor output SSA is positive and the second drive signal DRVA2 is a signal that generates a pulse only when the sensor output SSA is negative, and they are shown together in FIGS. 7B to 7E. Further, for convenience, the second drive signal DRVA2 is drawn as a pulse at the negative side.

FIGS. 8A to 8D are explanatory diagrams showing correspondence relationships between waveforms of sensor outputs and waveforms of drive signals generated in the PWM part 530. In the drawings, "Hiz" means a high impedance state. The drive signals DRVA1, DRVA2 for A-phase are generated by PWM control using the analog waveform of the A-phase sensor output SSA without change. The drive signals DRVB1, DRVB2 for B-phase are similarly generated. Therefore, using these drive signals, effective voltages exhibiting level changes corresponding to the changes of the sensor outputs SSA, SSB can be supplied to the A-phase electromagnetic coil 31a and the B-phase electromagnetic coil 31b.

The PWM part 530 is adapted to output drive signals only in the excitation sections shown by the excitation section signals Ea, Eb, but not output drive signals in the sections other than the excitation sections (non-excitation sections). FIGS. 8E and 8F show drive signal waveforms when the excitation sections EP and the non-excitation sections NEP are set by the excitation section signals Ea, Eb.

In the excitation sections EP, the drive signal pulses in FIGS. 8C and 8D are generated without change, and, in the non-excitation sections NEP, no drive signal pulse is generated. In this manner, by setting the excitation sections EP and the non-excitation sections NEP, no voltage is applied to the coils near the medium point of the back electromotive force waveform (that is, near the medium point of the sensor output), and the drive efficiency of the linear motor 10 can be further improved.

Note that it is preferable that the excitation sections EP are set in symmetric sections with respect to the peak of the back electromotive force waveform (induced voltage waveform) and the non-excitation sections NEP are set in symmetric sections with respect to the medium point (center point) of the back electromotive force waveform. In other words, it is preferable that the excitation sections EP are set in symmetric sections with respect to the π/2 phase point given that the position in which the polarity is reversed in the waveform of the induced voltage induced in the electromagnetic coil 31 due to movement of the permanent magnet 21 is the π phase point.

Further, it is preferable that non-excitation sections NEP are set in symmetric sections with respect to the π phase point of the waveform of the induced voltage. Note that, it is preferable that, when the phase of the current is delayed relative to the voltage, timing control is performed so that the peak of the current waveform may coincide with the peak of the induced voltage waveform.

Here, as described above, when the voltage command value Ya is set to a value less than "1", the multiplication value Ma becomes smaller in proportion to the voltage command value Ya. Therefore, the effective application voltage can be also adjusted using the voltage command value Ya.

As understood from the above explanation, in the linear motor 10 of the embodiment, the application voltage can be adjusted using both the voltage command value Ya and the excitation section signal Ea. This is applicable to the B-phase.

Note that the relationships between the desired application voltage and the voltage command value Ya and the excitation section signal Ea may be stored as a table in a memory (not shown) within the PWM control part 110 in advance. Further, for the adjustment of the application voltage, it is not necessary to use both the voltage command value Ya and the excitation section signal Ea, but only one of them may be used.

Figure 9:
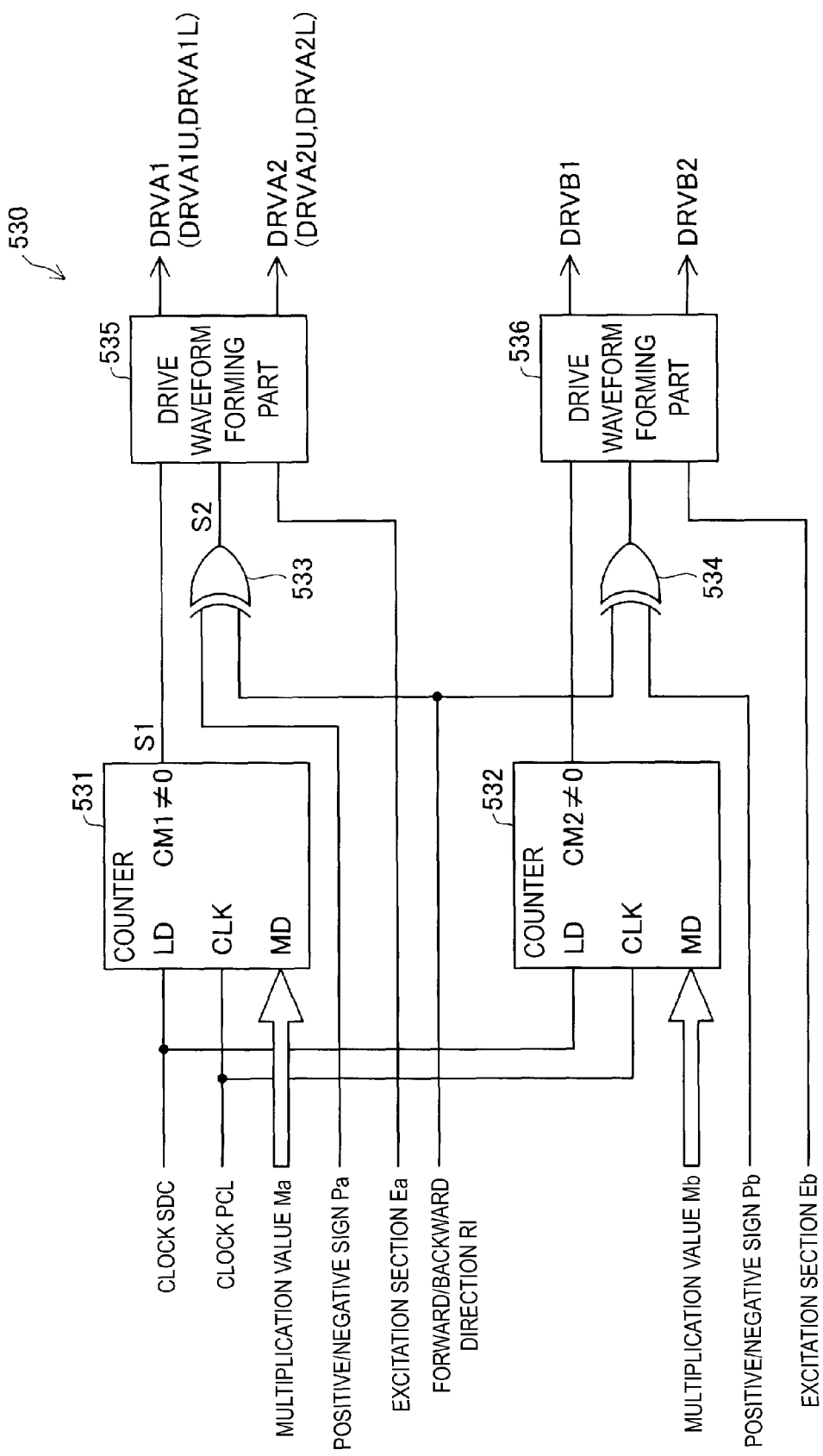
FIG. 9 is a block diagram showing an example of an internal configuration of the PWM part.

FIG. 9 is a schematic block diagram showing an example of an internal configuration of the PWM part 530 (FIG. 7A). The PWM part 530 includes counters 531, 532, EXOR circuits 533, 534, and drive waveform forming parts 535, 536. The counter 531, the EXOR circuit 533, and the drive waveform forming part 535 form a circuit for A-phase, and the counter 532, the EXOR circuit 534, and the drive waveform forming part 536 form a circuit for B-phase. They operate in the following manner.

Figure 10:
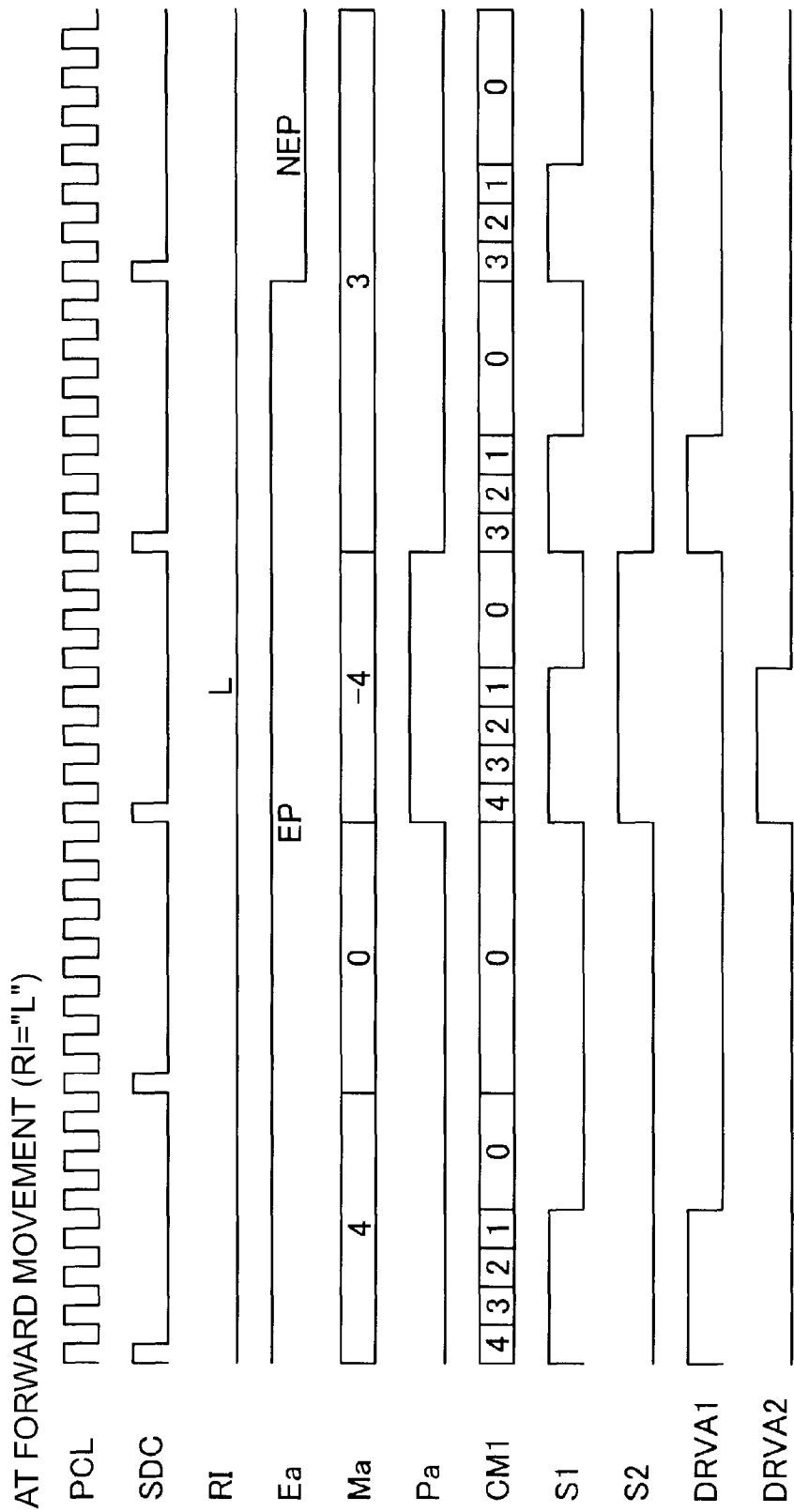
FIG. 10 is an explanatory diagram showing an operation of the PWM part when the slider is moved in a forward direction.

FIG. 10 is a timing chart showing an operation of the PWM part 530 when the slider 20 is moved in the forward direction. FIG. 10 shows the two clock signals PCL, SDC, the forward/backward direction indicator value RI, the excitation section signal Ea, the multiplication value Ma, the positive/negative sign signal Pa, the count value CM1 within the counter 531, the output S1 of the counter 531, and the output S2 of the EXOR circuit 533. Further, FIG. 10 shows the output signals DRVA1, DRVA2 of the drive waveform forming part 535.

The counter 531 repeats an operation of down-counting the count value CM1 to zero in synchronization with the clock signal PCL in each period of the clock signal SDC. The initial value of the count value CM1 is set to the multiplication value Ma. Note that, in FIG. 10, for convenience, a negative value is also shown as the multiplication value Ma, however, its absolute value |Ma| is used in the counter 531. The output S1 of the counter 531 is set to the H-level when the count value CM1 is not zero, and falls to the L-level when the count value CM1 becomes zero.

The EXOR circuit 533 outputs the signal S2 representing exclusive OR of the positive/negative sign signal Pa and the forward/backward direction indicator value RI. As described above, when the slider 20 moves in the forward direction, the forward/backward direction indicator value RI is at the L-level. Therefore, the output S2 of the EXOR circuit 533 is the same signal as the positive/negative sign signal Pa.

The drive waveform forming part 535 generates the drive signals DRVA1, DRVA2 from the output S1 of the counter 531 and the output S2 of the EXOR circuit 533. That is, the signal of the output S1 of the counter 531 in the period in which the output S2 of the EXOR circuit 533 is at the L-level is output as the first drive signal DRVA1, and the signal in the period in which the output S2 is at the H-level is output as the second drive signal DRVA2.

Here, near the right end in FIG. 10, the excitation section signal Ea falls to the L-level, and thereby, the non-excitation section NEP is set. Therefore, in the non-excitation section NEP, none of the drive signals DRVA1, DRVA2 is output and the high impedance state is maintained.

As understood from the above explanation, the counter 531 functions as a PWM signal generation circuit that generates the PWM signal based on the multiplication value Ma. Further, the drive waveform forming part 535 functions as a mask circuit that masks the PWM signal in response to the excitation section signal Ea.

Figure 11:
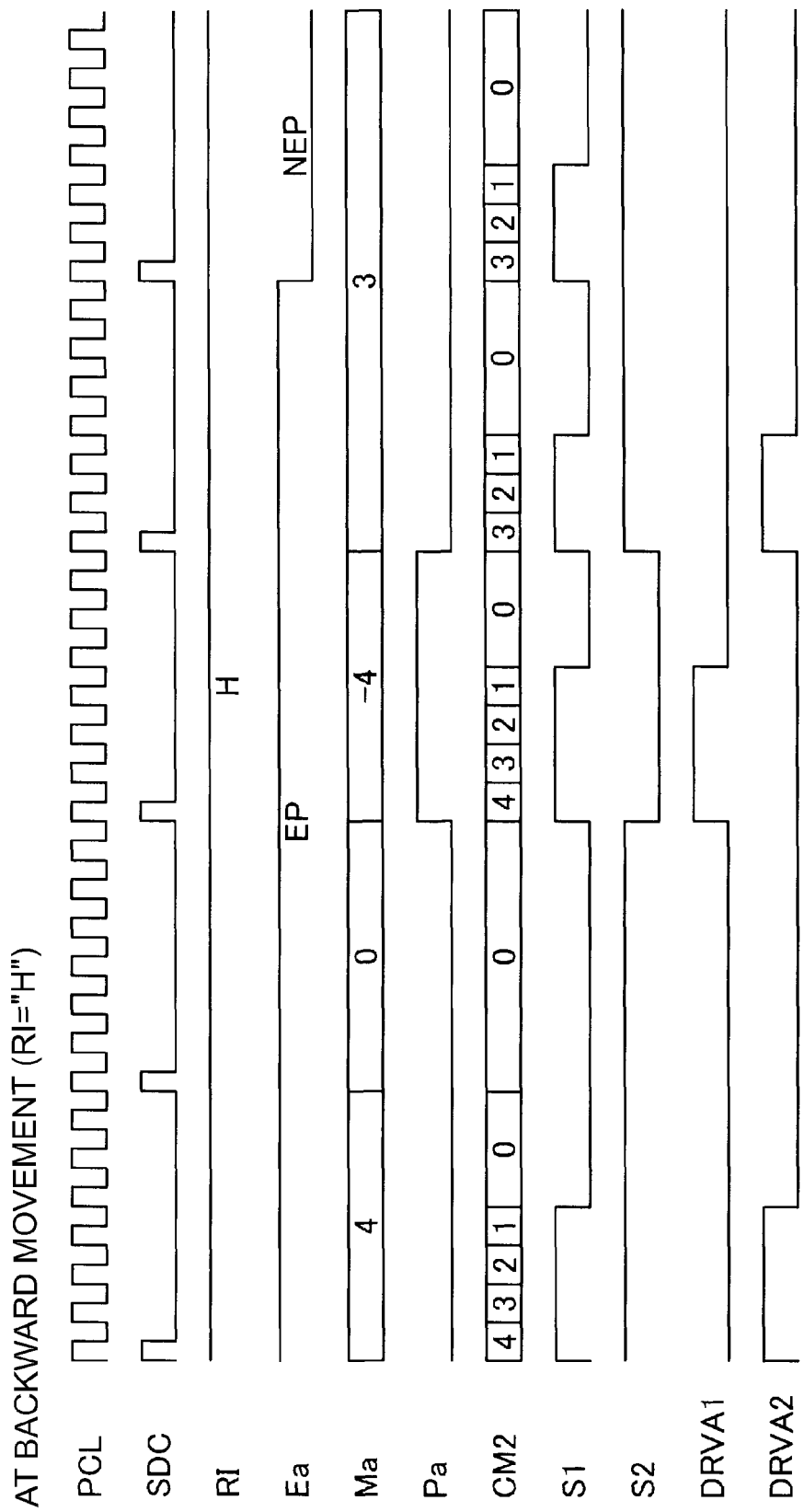
FIG. 11 is an explanatory diagram showing an operation of the PWM part when the slider is moved in a backward direction.

FIG. 11 is a timing chart showing an operation of the PWM part 530 when the slider 20 is moved in the backward direction. As described above, when the slider 20 moves in the backward direction, the forward/backward direction indicator value RI is set at the H-level. As a result, the waveforms of the two drive signals DRVA1, DRVA2 are replaced from those in FIG. 10 and the movement direction of the slider 20 is reversed. The circuits 532, 534, 536 for B-phase of the PWM part 530 operate in the same manner.

Figure 12A:
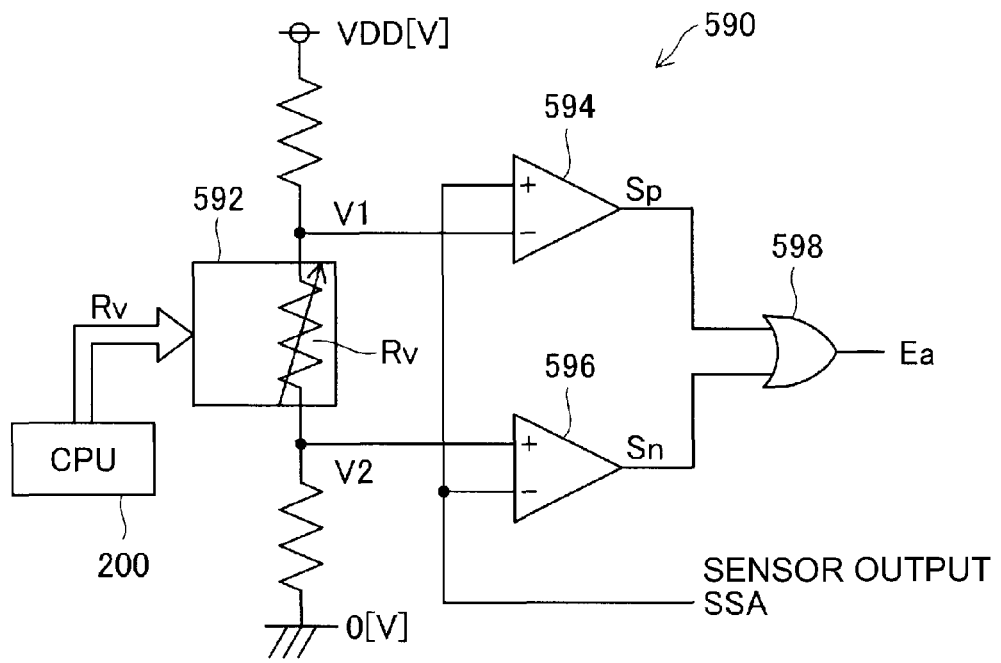
FIGS. 12A and 12B are explanatory diagrams showing an internal configuration and an operation of an excitation section setting part.
Figure 12B:
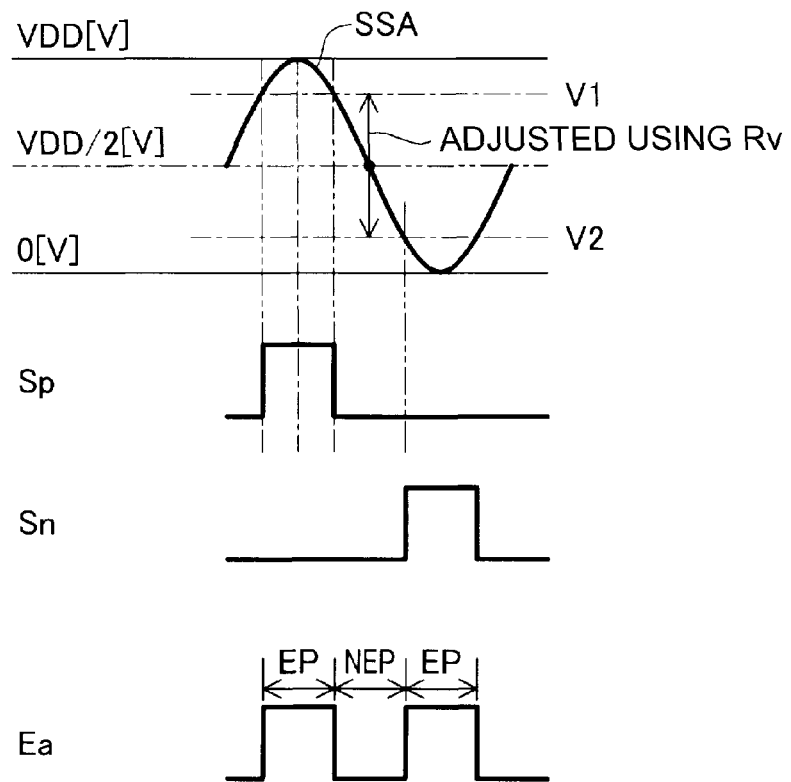

FIGS. 12A and 12B are explanatory diagrams showing an internal configuration and an operation of the excitation section setting part 590. Note that, in FIGS. 12A and 12B, the configuration and the operation of the circuit for A-phase are shown, and illustration of the configuration and the operation of the circuit for B-phase is omitted for convenience. The excitation section setting part 590 has an electronic variable resistor 592, voltage comparators 594, 596, and an OR circuit 598. The resistance value Rv of the electronic variable resistor 592 is set by the CPU 200.

The voltages V1, V2 on both ends of the electronic variable resistor 592 are provided to one input terminals of the voltage comparators 594, 596. To the other input terminals of the voltage comparators 594, 596, the sensor output SSA of the A-phase position detection sensor 40a is supplied. The output signals Sp, Sn of the voltage comparators 594, 596 are input to the OR circuit 598 and the OR circuit 598 outputs the output signal Ea.

FIG. 12B shows an operation of the excitation section setting part 590. In the upper part of FIG. 12B, an example of an output waveform of the sensor output SSA is shown, in the middle part of FIG. 12B, an example of the output signals of the two voltage comparators 594, 596 is shown in parallel. Further, in the lower part of FIG. 12B, an example of the output signal Ea of the OR circuit 598 is shown.

The end voltages V1, V2 of the electronic variable resistor 592 are changed by adjustment of the resistance value Rv. Specifically, the end voltages V1, V2 are set to values with equal differences from the median value (=VDD/2) of the voltage range (in the upper part of FIG. 12B).

When the sensor output SSA is higher than the first voltage V1, the output Sp of the first voltage comparator 594 is at the H-level. On the other hand, when the sensor output SSA is lower than the second voltage V2, the output Sn of the second voltage comparator 596 is at the H-level (in the middle part of FIG. 12B). Further, the excitation section signal Ea is a signal obtained by OR of the output signals Sp, Sn (in the lower part of FIG. 12B).

In this manner, the excitation section signal Ea may be used as the signal indicating the excitation section EP and the non-excitation section NEP, and setting of the excitation section EP and the non-excitation section NEP may be executed by the adjustment of the variable resistance value Rv by the CPU 200. The setting function of the excitation section EP and the non-excitation section NEP may be realized by another circuit than the CPU 200.

The configuration of the circuit for B-phase of the excitation section setting part 590 is the same as the configuration of the circuit for A-phase. Further, the operation in the circuit for B-phase is the same as that of the above described circuit for A-phase except that the sensor output SSB of the B-phase position detection sensor 40b is input to the voltage comparators 594, 596 and the output signal Eb is output from the OR circuit 598.

Figure 13A:
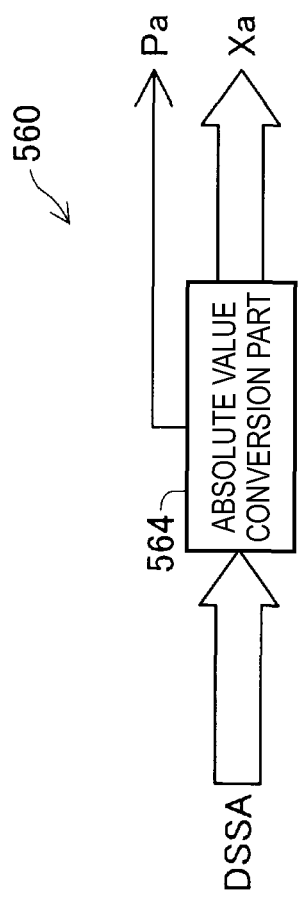
FIGS. 13A and 13B are explanatory diagrams showing an internal configuration and an operation of a coding part for A-phase.

FIG. 13A is a schematic block diagram showing an internal configuration of the coding part 560 for A-phase. The internal configuration of the coding part 562 for B-phase is the same as that of the internal configuration of the coding part 560 for A-phase, and its illustration and explanation will be omitted. The coding part 560 includes an absolute value conversion part 564. The absolute value conversion part 564 generates the sensor output value Xa and the positive/negative sign signal Pa in response to the sensor signal DSSA converted into the digital signal in the AD conversion part 570 (FIG. 7A).

Figure 13B:
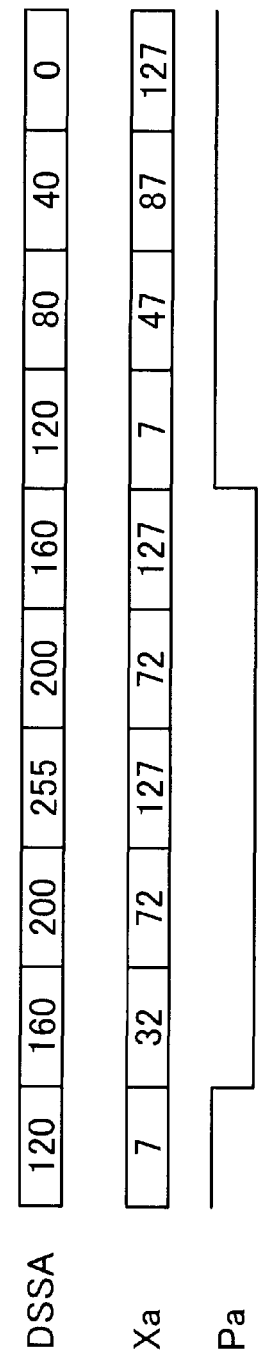

FIG. 13B is a timing chart showing an operation of the coding part 560. In the coding part 560, the sensor output value Xa and the value of the positive/negative sign signal Pa are set as follows. Note that they are similarly set in the coding part 562 for B-phase.

(1a) When the digital value DSSA is equal to or more than a predetermined value (128), $Xa = DSSA - 128$ $Pa = 0$ (indicating that the sensor waveform is in the positive range)

(1b) When the digital value DSSA is less than the predetermined value (128), $Xa = 127 - DSSA$ $Pa = 1$ (indicating that the sensor waveform is in the negative range)

That is, as the sensor output value Xa, a value representing the change of the sensor output SSA is generated.

Figure 14A:
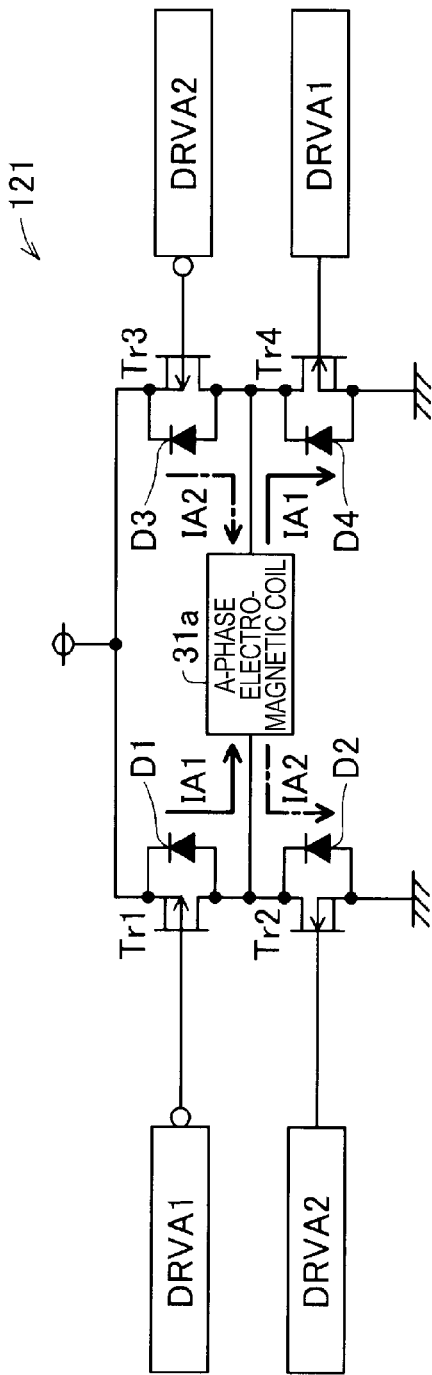
FIGS. 14A and 14B are schematic diagrams showing configurations of driver circuits.
Figure 14B:
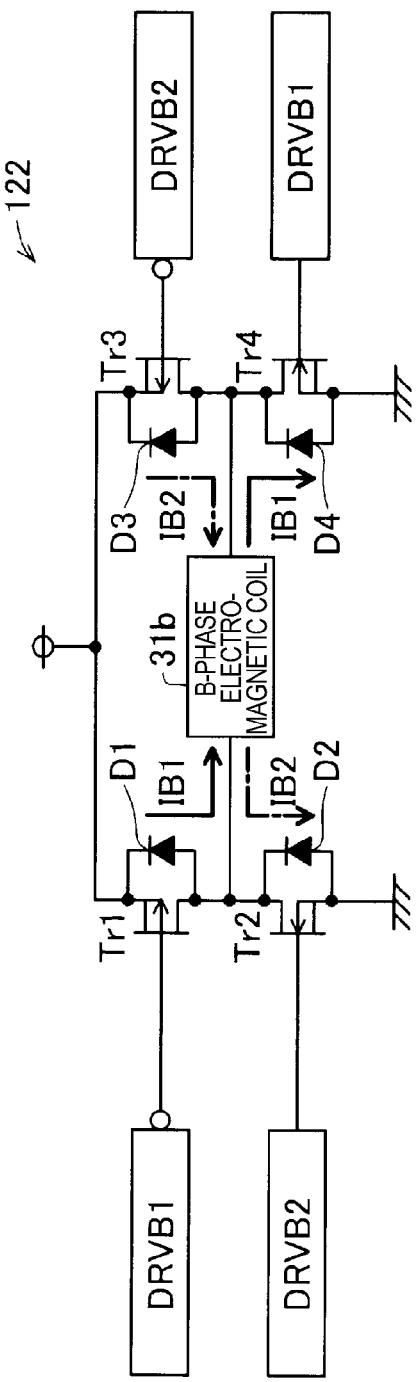

FIGS. 14A and 14B are schematic diagrams showing configurations of the driver circuits 120. FIG. 14A shows a configuration of the A-phase drive part 121, and FIG. 14B shows a configuration of the B-phase drive part 122. As below, the configuration of the A-phase drive part 121 in FIG. 14A will be explained, and the configuration of the B-phase drive part 122 in FIG. 14B is the same as that of the A-phase drive part 121 and its explanation will be omitted.

The A-phase drive part 121 includes four transistors Tr1 to Tr4 and diodes D1 to D4 forming an H-shaped bridge circuit. The first and second transistors Tr1 and Tr2 are connected in series to each other. Also, the third and fourth transistors Tr3 and Tr4 are connected in series to each other. The first and second transistors Tr1 and Tr2 and the third and fourth transistors Tr3 and Tr4 are connected in parallel between the power supply and the ground.

The A-phase electromagnetic coil 31a is connected between the connection part of the first and second transistors Tr1 and Tr2 and the third and fourth transistors Tr3 and Tr4. The respective diodes D1 to D4 are connected to the drains and sources of the respective transistors Tr1 to Tr4.

An inverted signal of the first drive signal DRVA1 is supplied to the gate of the first transistor Tr1 and the first drive signal DRVA1 is supplied to the gate of the fourth transistor Tr4. On the other hand, the second drive signal DRVA2 is supplied to the gate of the second transistor Tr2 and an inverted signal of the second drive signal DRVA2 is supplied to the gate of the third transistor Tr3.

The A-phase drive part 121 supplies a current IA1 to the A-phase electromagnetic coil 31a when the first drive signal DRVA1 is at the H-level. Further, the A-phase drive part 121 supplies a current IA2 flowing in an opposite direction to the current IA1 to the A-phase electromagnetic coil 31a when the second drive signal DRVA2 is at the H-level. On the other hand, the B-phase drive part 122 supplies a current IB1 to the B-phase electromagnetic coil 31b when the third drive signal DRVB1 is at the H-level. Further, the B-phase drive part 122 supplies a current IB2 flowing in an opposite direction to the current IB1 to the B-phase electromagnetic coil 31b when the fourth drive signal DRVB2 is at the H-level.

Figure 15A:
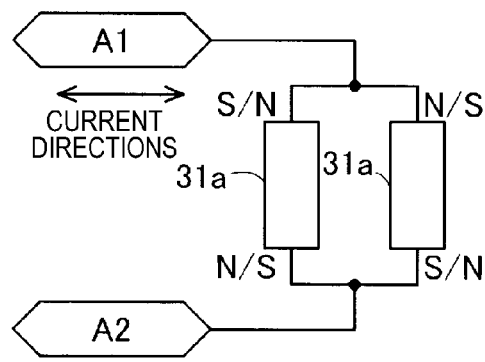
FIGS. 15A to 15D are explanatory diagrams showing connection configurations between A-phase electromagnetic coils and between B-phase electromagnetic coils.
Figure 15B:
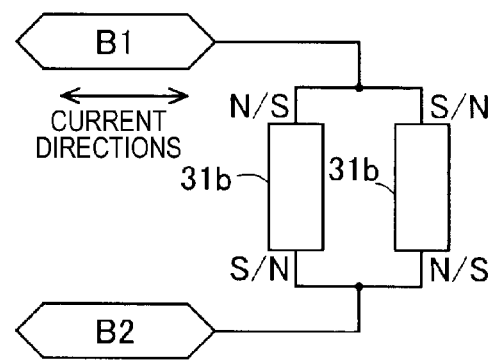
Figure 15C:
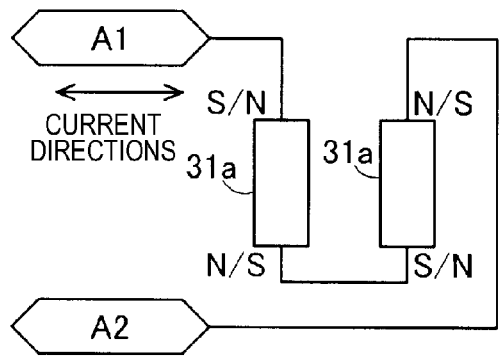
Figure 15D:
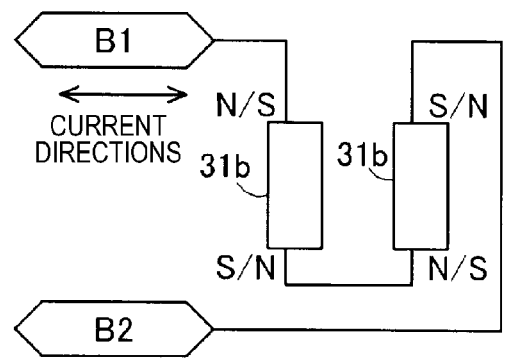

FIGS. 15A to 15D are explanatory diagrams showing connection configurations between the two A-phase electromagnetic coils 31a and between the two B-phase electromagnetic coils 31b. FIGS. 15A and 15B respectively show parallel connection between the two A-phase electromagnetic coils 31a and parallel connection between two B-phase electromagnetic coils 31b. FIGS. 15C and 15D respectively show series connection between the two A-phase electromagnetic coils 31a and series connection between two B-phase electromagnetic coils 31b. In this manner, the connection between the electromagnetic coils 31a, 31b for the respective phases may be parallel connection or series connection.

According to the control unit 100 of the embodiment, PWM control using the sensor output of the position detection sensors 40a, 40b for two phases provided in correspondence with the electromagnetic coils 31a, 31b for two phases is executed for the linear motor 10. Accordingly, highly-efficient drive of the linear motor 10 can be performed.

A2-2. Position Detection Processing

Figure 16:
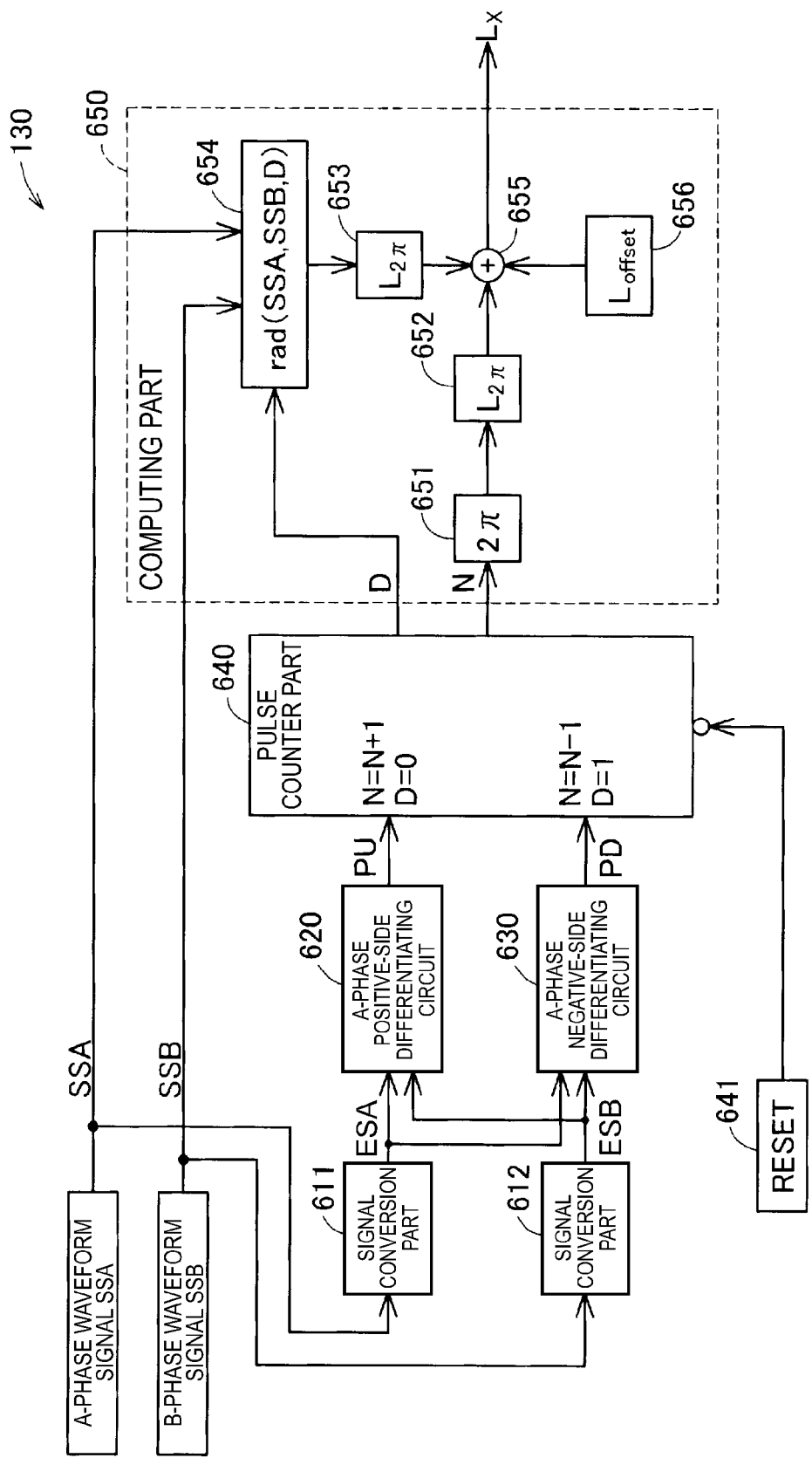
FIG. 16 is a schematic diagram showing an internal configuration of a position detection part.

FIG. 16 is a schematic block diagram showing an internal configuration of the position detection part 130. The position detection part 130 includes two signal conversion parts 611, 612, an A-phase positive-side differentiating circuit 620, an A-phase negative-side differentiating circuit 630, a pulse counter part 640, and a computing part 650. Here, as has been explained in FIG. 6, the position detection part 130 receives the sensor outputs SSA, SSB as waveform signals from the respective A-phase position detection sensor 40a and B-phase position detection sensor 40b. Hereinafter, these sensor outputs SSA, SSB are respectively referred to as "waveform signals SSA, SSB".

Figure 17:
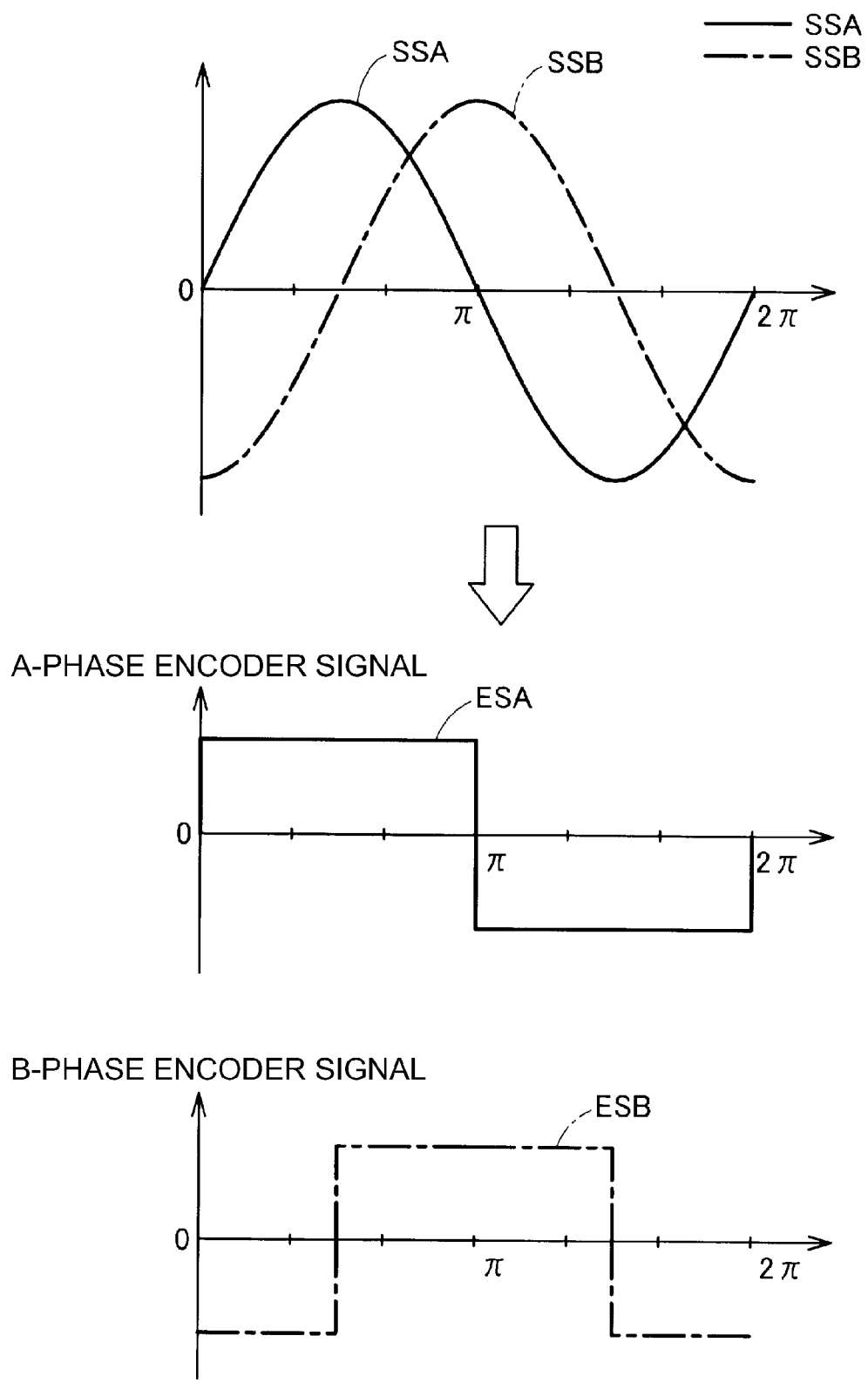
FIG. 17 is an explanatory diagram for explanation of transformation of signal waveforms for two phases into encoder signal waveforms.

FIG. 17 is a schematic diagram for explanation of the functions of the two signal conversion parts 611, 612. In the upper part of FIG. 17, an example of the waveform signals SSA, SSB is shown, and, in the lower part of FIG. 17, an example of an A-phase encoder signal ESA and an example of a B-phase encoder signal ESB corresponding to the waveform signals are respectively shown in parallel.

The two signal conversion parts 611, 612 of the position detection part 130 generate the A-phase encoder signal ESA and the B-phase encoder signal ESB from the waveform signals SSA, SSB for two phases, respectively. The A-phase encoder signal ESA and the B-phase encoder signal ESB are pulse signals for which phases and amplitudes are extracted from the waveform signals SSA, SSB for the respective phases. The two signal conversion parts 611, 612 transmit these encoder signals ESA, ESB to both the A-phase positive-side differentiating circuit 620 and the A-phase negative-side differentiating circuit 630.

Figure 18A:
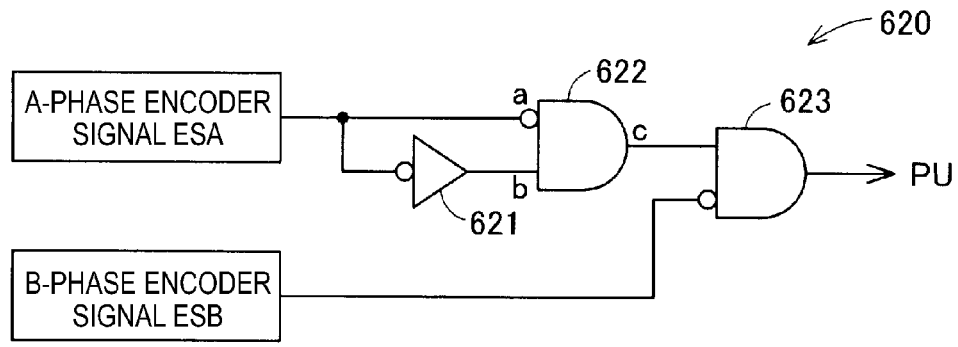
FIGS. 18A to 18F are schematic diagrams for explanation of configurations and functions of two partial circuits.
Figures 18B, 18C:
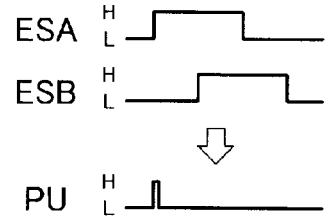

FIGS. 18A to 18C are schematic diagrams for explanation of a configuration and a function of the A-phase positive-side differentiating circuit 620. FIG. 18A shows an internal configuration of the A-phase positive-side differentiating circuit 620. The A-phase positive-side differentiating circuit 620 includes a NOT element 621 and first and second AND elements 622, 623. The NOT element 621 receives input of the A-phase encoder signal ESA and outputs its inverted signal. For the first AND element 622, the A-phase encoder signal ESA is input to the input a side and the output signal of the NOT element 621 is input to the input b side.

FIG. 18B shows an operation table of the first AND element 622. The first AND element 622 outputs a high signal (H) when a low signal (L) is input to the input a side and a high signal (H) is input to the input b side. Further, the first AND element 622 outputs a low signal (L) in all cases of other combinations of input signals.

Here, the NOT element 621 intervenes at the input b side of the first AND element 622. Accordingly, in the first AND element 622, a signal slightly delayed relative to the signal at the input a side is input to the input b side. Thereby, the first AND element 622 outputs a high signal at the time when the pulse of the A-phase encoder signal ESA rises.

The output signal of the first AND element 622 and the B-phase encoder signal ESB are input to the second AND element 623 (FIG. 18A). The second AND element 623 outputs a high signal when the B-phase encoder signal ESB is low and the output signal of the first AND element 622 is high.

Further, the second AND element 623 outputs a low signal always when the B-phase encoder signal ESB is high. That is, the second AND element 623 switches whether to output a high signal representing the time when the pulse of the A-phase encoder signal ESA output from the first AND element 622 rises or not in response to the pulse of the B-phase encoder signal ESB.

FIG. 18C is an explanatory diagram showing an operation of the A-phase positive-side differentiating circuit 620. FIG. 18C respectively shows an example of two encoder signals ESA, ESB when the slider 20 moves in the forward direction and an example of an output signal PU generated based on the two encoder signals ESA, ESB.

Here, in the linear motor 10, when the slider 20 is moved in the forward direction, the phase of the B-phase encoder signal ESB is delayed by an electrical angle of $\pi/2$ relative to the phase of the A-phase encoder signal ESA. Therefore, when the slider 20 moves in the forward direction, the B-phase encoder signal ESB is low always when the pulse of the A-phase encoder signal ESA rises. Accordingly, when the slider 20 moves in the forward direction, the A-phase positive-side differentiating circuit 620 outputs a high signal representing the time when the pulse of the A-phase encoder signal ESA rises as the output signal PU.

Note that, in the linear motor 10, when the slider 20 moves in the backward direction, the phase of the A-phase encoder signal ESA is delayed by an electrical angle of $\pi/2$ relative to the phase of the B-phase encoder signal ESB. Therefore, the B-phase encoder signal ESB is high always when the pulse of the A-phase encoder signal ESA rises. Accordingly, when the slider 20 moves in the backward direction, the A-phase positive-side differentiating circuit 620 always outputs a low signal.

Figure 18D:
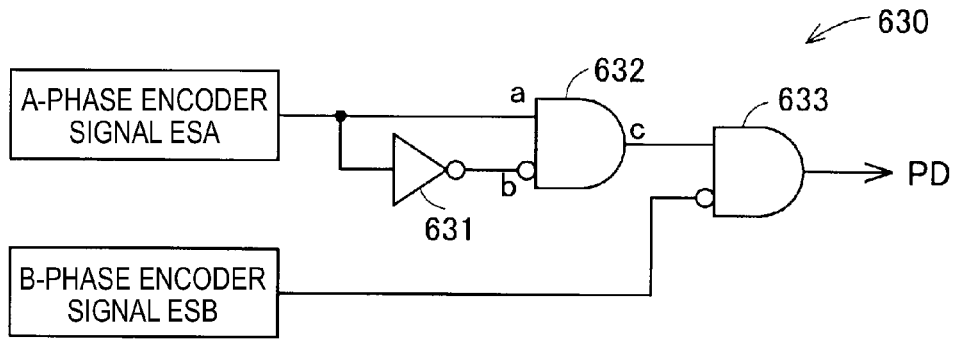
Figures 18E, 18F:
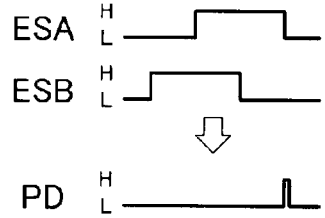

FIGS. 18D to 18F are schematic diagrams for explanation of a configuration of the A-phase negative-side differentiating circuit 630. FIG. 18D shows an internal configuration of the A-phase negative-side differentiating circuit 630. The A-phase negative-side differentiating circuit 630 includes a NOT element 631 and first and second AND elements 632, 633. The NOT element 631 receives input of the A-phase encoder signal ESA and outputs its inverted signal. For the first AND element 632, the A-phase encoder signal ESA is input to the input a side and the output signal of the NOT element 631 is input to the input b side.

FIG. 18E shows an operation table of the first AND element 632. The first AND element 632 outputs a high signal when a high signal is input to the input a side and a low signal is input to the input b side. Further, the first AND element 632 outputs a low signal in all cases of other combinations of input signals. By the configuration, the first AND element 632 outputs a high signal at the time when the pulse of the A-phase encoder signal ESA falls.

The output signal of the first AND element 632 and the B-phase encoder signal ESB are input to the second AND element 633 (FIG. 18D). The second AND element 633 outputs a high signal when the B-phase encoder signal ESB is low and the output signal of the first AND element 632 is high. Further, the second AND element 633 outputs a low signal always when the B-phase encoder signal ESB is high. That is, the second AND element 633 switches whether to output a high signal representing the time when the pulse of the A-phase encoder signal ESA output from the first AND element 632 falls or not in response to the B-phase encoder signal ESB.

FIG. 18F is an explanatory diagram showing an operation of the A-phase negative-side differentiating circuit 630. FIG. 18F respectively shows an example of two encoder signals ESA, ESB when the slider 20 moves in the backward direction and an example of an output signal PD generated based on the two encoder signals ESA, ESB.

As shown in FIG. 18F, when the slider 20 moves in the backward direction, the B-phase encoder signal ESB is low always when the pulse of the A-phase encoder signal ESA rises. Accordingly, when the slider 20 moves in the backward direction, the A-phase negative-side differentiating circuit 630 outputs a high signal representing the time when the pulse of the A-phase encoder signal ESA falls as the output signal PD. When the slider 20 moves in the forward direction, the B-phase encoder signal ESB is high always when the pulse of the A-phase encoder signal ESA falls, and the A-phase negative-side differentiating circuit 630 always outputs a low signal.

The pulse counter part 640 (FIG. 16) receives the output signals PU, PD from the A-phase positive-side differentiating circuit 620 and the A-phase negative-side differentiating circuit 630, respectively. The pulse counter part 640 increments the count value N as a variable (N=N+1) when receiving the high signal in the output signal PU. Further, the pulse counter part 640 sets a variable D as a flag representing the movement direction of the slider 20 to "0" (D=0).

On the other hand, the pulse counter part 640 decrements the count value N (N=N−1) when receiving the high signal in the output signal PD. Further, the pulse counter part 640 sets the variable D to "1" (D=1). Note that the pulse counter part 640 may initialize the count value N according to a command from a reset signal output part 641.

FIGS. 19A and 19B are timing charts respectively showing examples of changes of the above described respective signals SSA, SSB, ESA, ESB, PU, PD and the count value N. FIG. 19A is a timing chart when the slider 20 moves in the forward direction, and FIG. 19B is a timing chart when the slider 20 moves in the backward direction.

In this manner, in the position detection part 130 (FIG. 16), the count value N is changed at each time when the rising/falling of the pulses in the pulse signals PU, PD generated based on the sensor outputs SSA, SSB. That is, the count value N changes in response to the change of the position of the slider 20 relative to the stator 30. In the position detection part 130, the position coordinate of the slider 20 is computed using the count value N and the sensor outputs SSA, SSB in the computing part 650.

In the computing part 650, the following arithmetic expression (A) is executed and the position coordinate of the slider 20 is computed.

$$Lx = (2\pi \cdot N + \text{rad}(SSA, SSB, D)) \cdot L_{2\pi} + L_{\text{offset}} \quad (A)$$

Lx: coordinate value representing position of slider 20
N: count value
rad (SSA, SSB, D): function of outputting radian corresponding to value of waveform signal SSA based on waveform signals SSA, SSB and variable D
$L_{2\pi}$: value representing movement distance (distance value) of slider 20 corresponding to electrical angle $2\pi$
$L_{\text{offset}}$: offset distance value of slider 20

The computing part 650 includes a $2\pi$ multiplier 651, two $L_{2\pi}$ multipliers 652, 653, a rad function part 654, an adder 655, and an $L_{\text{offset}}$ storage part 656. The $2\pi$ multiplier 651 receives the count value N from the pulse counter part 640, multiplies the count value N by $2\pi$, and outputs it ($2\pi \cdot N$). The first $L_{2\pi}$ multiplier 652 multiplies the output value of the $2\pi$ multiplier 651 by $L_{2\pi}$ and outputs it ($2\pi \cdot N \cdot L_{2\pi}$). The rad function part 654 receives the two waveform signals SSA, SSB and receives the variable D from the pulse counter part 640. Then, the rad function part outputs radian corresponding to the value of the waveform signal SSA based on the waveform signals SSA, SSB and the variable D.

Here, since the waveform signal SSA is a nearly sine wave signal, except when its value is the maximum or the minimum, two values r1, r2 (r1<r2) are obtained as candidates for the output value of the rad function part 654 for the radian corresponding to the value of the waveform signal SSA. In this regard, when the slider 20 moves in the forward direction (when the value of the variable D is "0"), the rad function part 654 outputs r1 as the output value if the value of the waveform signal SSB is negative and outputs r2 as the output value if the value of the waveform signal SSB is positive. Further, when the slider 20 moves in the backward direction (when the value of the variable D is "1"), the rad function part 654 outputs r1 as the output value if the value of the waveform signal SSB is positive and outputs r2 as the output value if the value of the waveform signal SSB is negative.

The second $L_{2\pi}$ multiplier 653 outputs a value obtained by multiplication of the output value of the rad function part 654 by $L_{2\pi}$ (rad(SSA, SSB, D)·$L_{2\pi}$). The adder 655 adds the respective output values of the first and second $L_{2\pi}$ multipliers 652, 653 and outputs it ($2\pi \cdot N \cdot L_{2\pi}$+rad(SSA, SSB, D)·$L_{2\pi}$). The adder 655 adds the respective output values of the first and second $L_{2\pi}$ multipliers 652, 653 and $L_{offset}$ as the value stored in the $L_{offset}$ storage part 656 and outputs it. The computing part 650 outputs the output value of the adder 655 as the coordinate value Lx of the slider 20.

The position detection part 130 transmits the coordinate value Lx as a detection result to the control unit 100 and the CPU 200. The control unit 100 executes position control of the slider 20 based on the detection result. As described above, according to the control unit 100 of the embodiment, even when the encoder such as a resolver is omitted, the position detection part 130 detects the position of the slider 20 based on the sensor outputs SSA, SSB of the position detection sensors 40a, 40b for two phases. Therefore, accurate position control of the slider 20 can be performed and drive control of the linear motor 10 with higher accuracy can be performed.

A3. Another Configuration Example 1 of First Embodiment

Figures 20A, 20B:
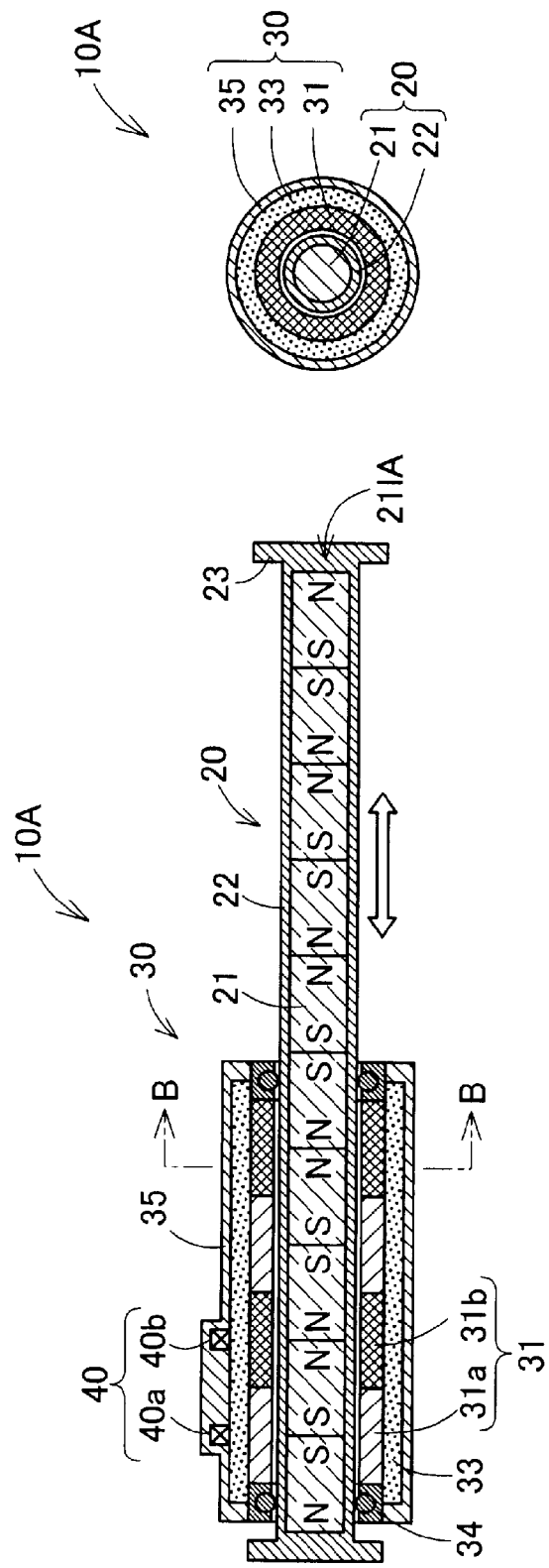
FIGS. 20A and 20B are schematic diagrams showing a configuration of a linear motor as another configuration example of the first embodiment.

FIGS. 20A and 20B are schematic diagrams showing a configuration of a linear motor 10A as another configuration example of the first embodiment. FIGS. 20A and 20B are nearly the same as FIGS. 1A and 1B except that a magnet row 211A with a different arrangement pitch of permanent magnets 21 is provided in place of the magnet row 211.

In the magnet row 211A of the linear motor 10A in the configuration example, the permanent magnets 21 are arranged with an arrangement pitch nearly a half of the arrangement pitch of the permanent magnets 21 in the magnet row 211 of the linear motor 10 of the first embodiment. That is, the arrangement pitch of the permanent magnets 21 in the magnet row 211A is nearly equal to the arrangement pitch of the electromagnetic coils 31.

FIGS. 21A to 21D are explanatory diagrams for explanation of control of currents in the linear motor 10A and movement of the slider 20 in response to the control. FIGS. 21A to 21D are nearly the same as FIGS. 21A and 21B except that the configuration of the magnet row 211 is different and the directions of the currents supplied to the electromagnetic coils 31a, 31b for the respective phases are different.

In the linear motor 10A in the configuration example, when the boundaries between the N-poles in the magnet row 211A are located in the positions of the first and the second A-phase electromagnetic coils 31a, currents in the same direction are allowed to flow in the first and the second A-phase electromagnetic coils 31a (FIGS. 21A, 21C). That is, in this regard, in the first and the second A-phase electromagnetic coils 31a, clockwise currents seen along the movement direction of the slider 20 are allowed to flow. This is the same when the boundaries between the N-poles in the magnet row 211A are located in the positions of the first and the second B-phase electromagnetic coils 31b (FIGS. 21B, 21D).

As described above, according to the linear motor 10A of the configuration example, its driving may be controlled by the simpler current control than that in the linear motor 10 of the first embodiment.

A4. Another Configuration Example 2 of First Embodiment

FIGS. 22A to 22E are schematic diagrams for explanation of modified examples in which the configuration of the coil back yoke 33 in the linear motor 10 is changed as another configuration example of the first embodiment. FIGS. 22A to 22E respectively show coil back yokes 33a to 33e having different configurations.

Figure 22A:
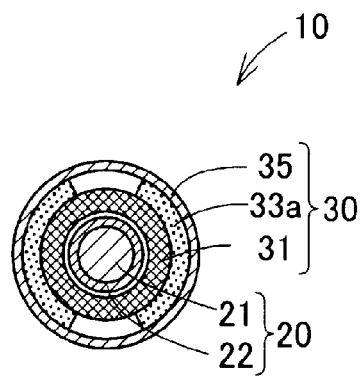
FIGS. 22A to 22E are schematic diagrams for explanation of a modified example in which a configuration of a coil back yoke in the linear motor is changed as another configuration example of the first embodiment.

FIG. 22A is nearly the same as FIG. 1B except that a coil back yoke 33a is provided in place of the coil back yoke 33. The coil back yoke 33a in the configuration example has a configuration in which part of the coil back yoke 33 of the first embodiment is omitted and does not cover the entire outer circumferences of the electromagnetic coils 31.

Figure 22B:
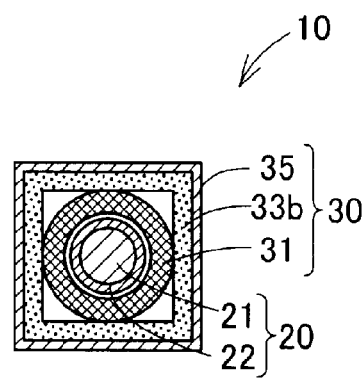

FIG. 22B is nearly the same as FIG. 22A except that a coil back yoke 33b is provided in place of the coil back yoke 33a and the shape of the casing 35 is different. The coil back yoke 33b of the configuration example has a nearly square cylinder shape containing the electromagnetic coils 31. Further, in the configuration example, the casing 35 is formed in the nearly square cylinder shape conforming with the shape of the coil back yoke 33b.

Figure 22C:
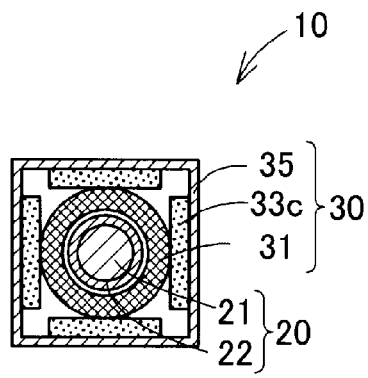

FIG. 22C is nearly the same as FIG. 22B except that a coil back yoke 33c is provided in place of the coil back yoke 33b. The coil back yoke 33c in the configuration example has a configuration in which corners of the coil back yoke 33b in FIG. 22B are omitted. That is, the coil back yoke 33c has a configuration in which parts are separately provided with respect to each of four inner wall surfaces of the casing 35.

Figure 22D:
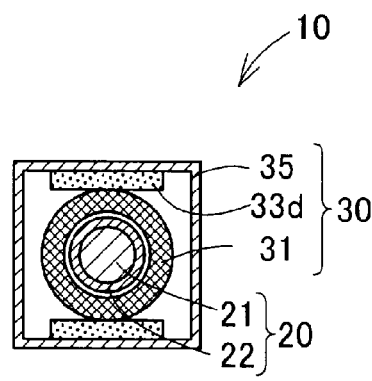

FIG. 22D is nearly the same as FIG. 22B except that a coil back yoke 33d is provided in place of the coil back yoke 33c. The coil back yoke 33d in the configuration example has a configuration in which a pair of parts opposed to each other of the coil back yoke 33c are omitted. That is, the coil back yoke 33d has a configuration in which parts are separately provided on a pair of inner wall surfaces opposed to each other of the casing 35.

As described above, even the configurations of the coil back yokes 33a to 33d shown in FIGS. 22 A to 22D may improve the magnetic efficiency of the electromagnetic coils 31 compared to the case where the coil back yokes 33a to 33d are not provided. Therefore, the drive efficiency of the linear motor 10 may be improved. Note that the configuration example of the first embodiment in which the entire circumferential surfaces of the electromagnetic coils 31 are covered by the coil back yoke 33 is more preferable because the magnetic efficiency of the electromagnetic coils 31 may be further improved.

Figure 22E:
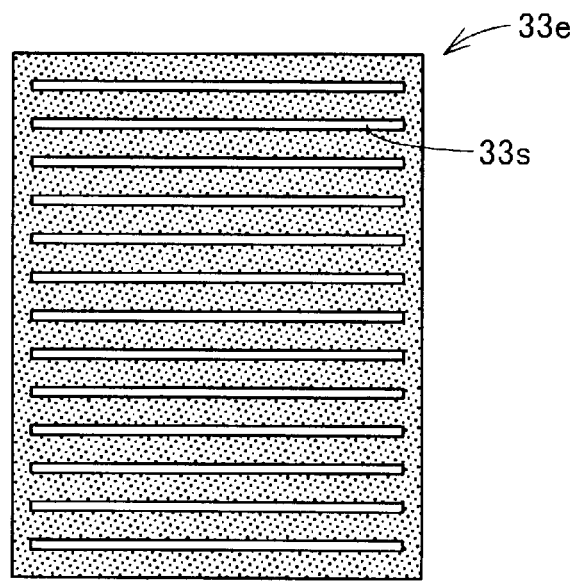

FIG. 22E is a schematic diagram showing a configuration of a coil back yoke 33e as another configuration example. FIG. 22E is a development view showing the coil back yoke 33e developed in the outer circumferential direction. The coil back yoke 33e is formed in a nearly circular cylindrical shape that covers the entire circumferential surfaces of the electromagnetic coils 31 like the coil back yoke 33 in the first embodiment.

In the coil back yoke 33e, plural parallel slits 33s extending in the center axis direction (in the horizontal direction of the paper) of the coil back yoke 33e are uniformly arranged over the circumferential direction (in the vertical direction of the paper) of the coil back yoke 33e. That is, in the coil back yoke 33e, the plural slits 33s along the movement direction of the slider 20 are formed.

Using the coil back yoke 33e with the slits 33s formed as described above, eddy currents generated in the coil back yoke 33e due to the changes of magnetic fields by the electromagnetic coils 31 and the slider 20 may be distributed with respect to each region between the slits 33s. Therefore, by applying the coil back yoke 33e to the linear motor 10, eddy-current loss in the linear motor 10 may be reduced and the drive efficiency of the linear motor 10 may be improved.

A5. Another Configuration Example 3 of First Embodiment

Figure 23:
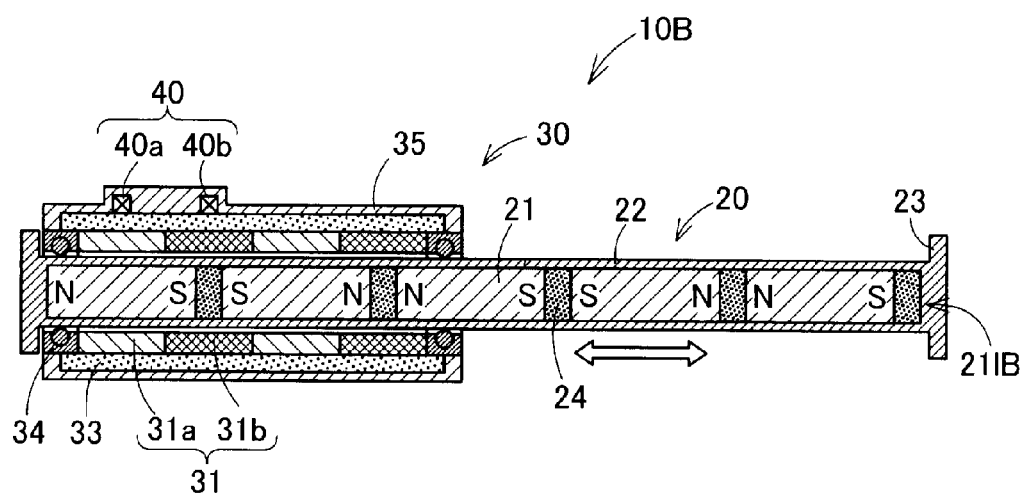
FIG. 23 is a schematic diagram showing a configuration of a linear motor as another configuration example of the first embodiment.

FIG. 23 is a schematic diagram showing a configuration of a linear motor 10B as another configuration example of the first embodiment. FIG. 23 is nearly the same as FIG. 1A except that magnet yokes 24 are added between permanent magnets 21 of a magnet row 211B. In the linear motor 10B in the configuration example, the magnet yokes 24 are inserted between the permanent magnets 21, and thus, the bonding step when the magnet row 211B is formed may be made easier. Note that, in the configuration example, the magnetic flux density at the boundary between the permanent magnets 21 may become lower and the detection accuracy of the change of the magnetic flux by the position detection sensor 40 may be lower. Therefore, in this regard, the configuration of the magnet row 211 of the linear motor 10 of the first embodiment is more preferable.

B. Second Embodiment

B1. Configuration of Linear Motor

Figures 24A, 24B:
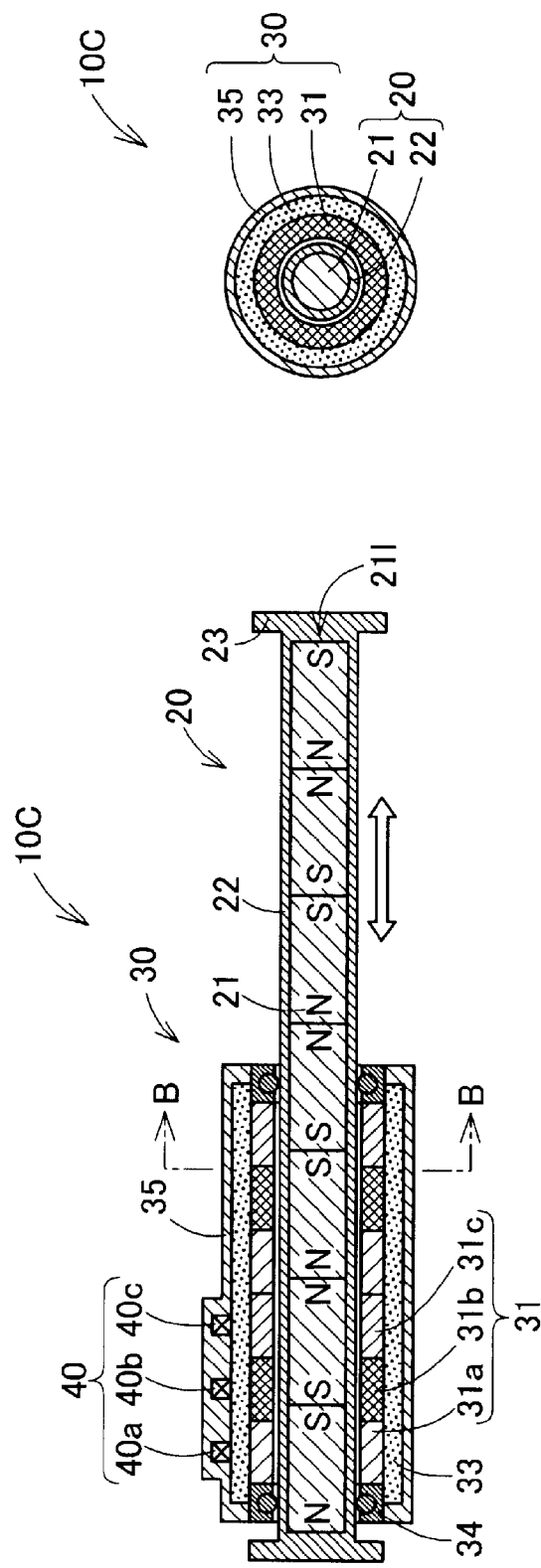
FIGS. 24A and 24B are schematic diagrams showing a configuration of a linear motor as the second embodiment.

FIGS. 24A, 24B are schematic diagrams showing a configuration of a linear motor 10C as the second embodiment of the invention. FIGS. 24A, 24B are nearly the same as FIGS. 1A and 1B except that C-phase electromagnetic coils 31c and a C-phase position detection sensor 40c are provided. In the stator 30 of the linear motor 10C, two sets of electromagnetic coils 31a, 31b, 31c for three phases are arranged in series. Further, in the stator 30 of the linear motor 10C, position detection sensors 40a, 40b, 40c corresponding to the respective phases are provided on the outer circumferences of the electromagnetic coils 31a, 31b, 31c for three phases on the left of the paper.

B2. Control of Linear Motor

Figure 25:
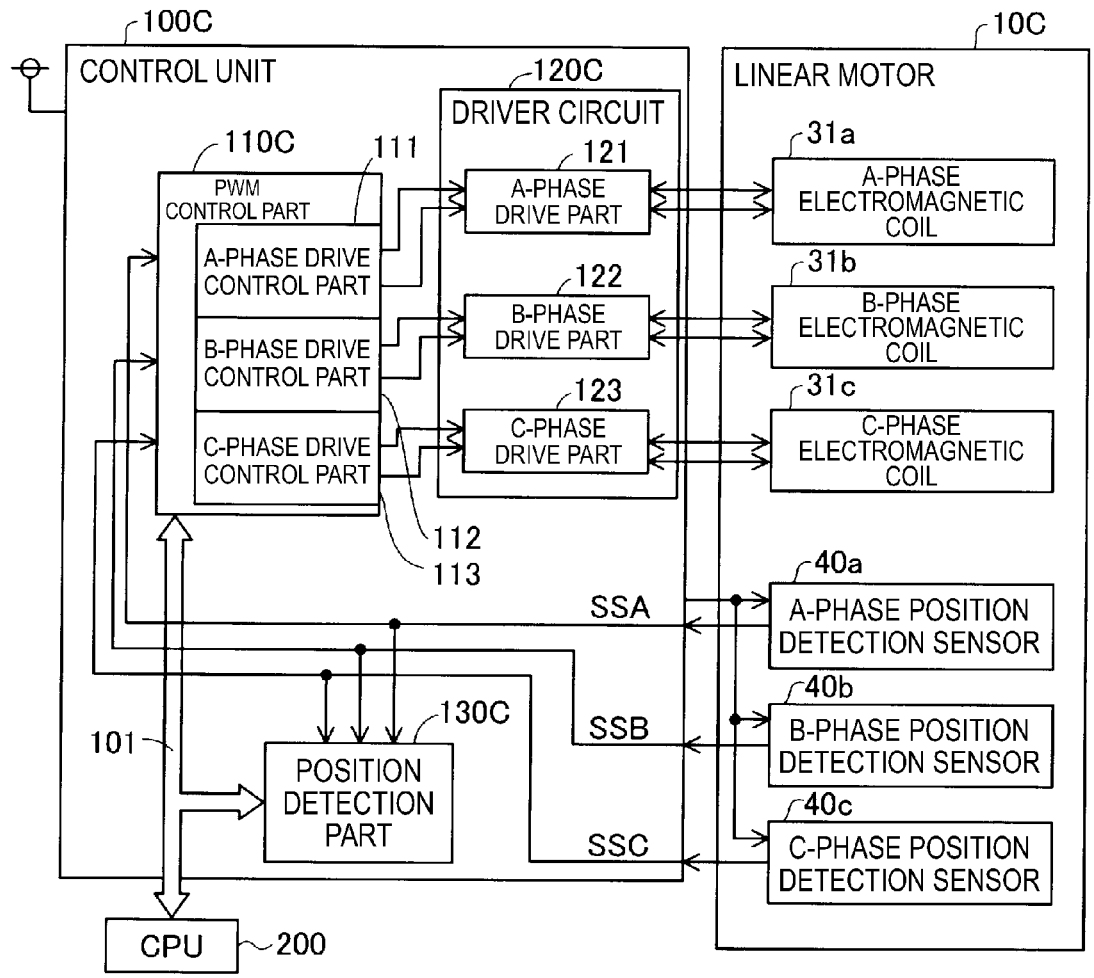
FIG. 25 is a schematic diagram showing a configuration of a control unit controlling the linear motor of the second embodiment.

FIG. 25 is a block diagram showing a configuration of a control unit 100C controlling the linear motor 10C of the second embodiment. FIG. 25 is nearly the same as FIG. 6 except that a C-phase drive control part 113 and a C-phase drive part 123 are added to a PWM control part 110C, a position detection part 130C is provided in place of the position detection part 130, and the C-phase electromagnetic coils 31c and the C-phase position detection sensor 40c are added to the linear motor 10C. The linear motor 10C of the second embodiment is PWM-controlled by the control unit 100C and the position detection of the slider 20 is executed.

B2-1. PWM Control

In the control unit 100C of the second embodiment, the PWM control part 110C has an A-phase drive control part 111, a B-phase drive control part 112, and a C-phase drive control part 113. Further, a driver circuit 120C has an A-phase drive part 121, a B-phase drive part 122, and a C-phase drive part 123 for driving the electromagnetic coils 31a, 31b, 31c for the respective phases.

Figure 26:
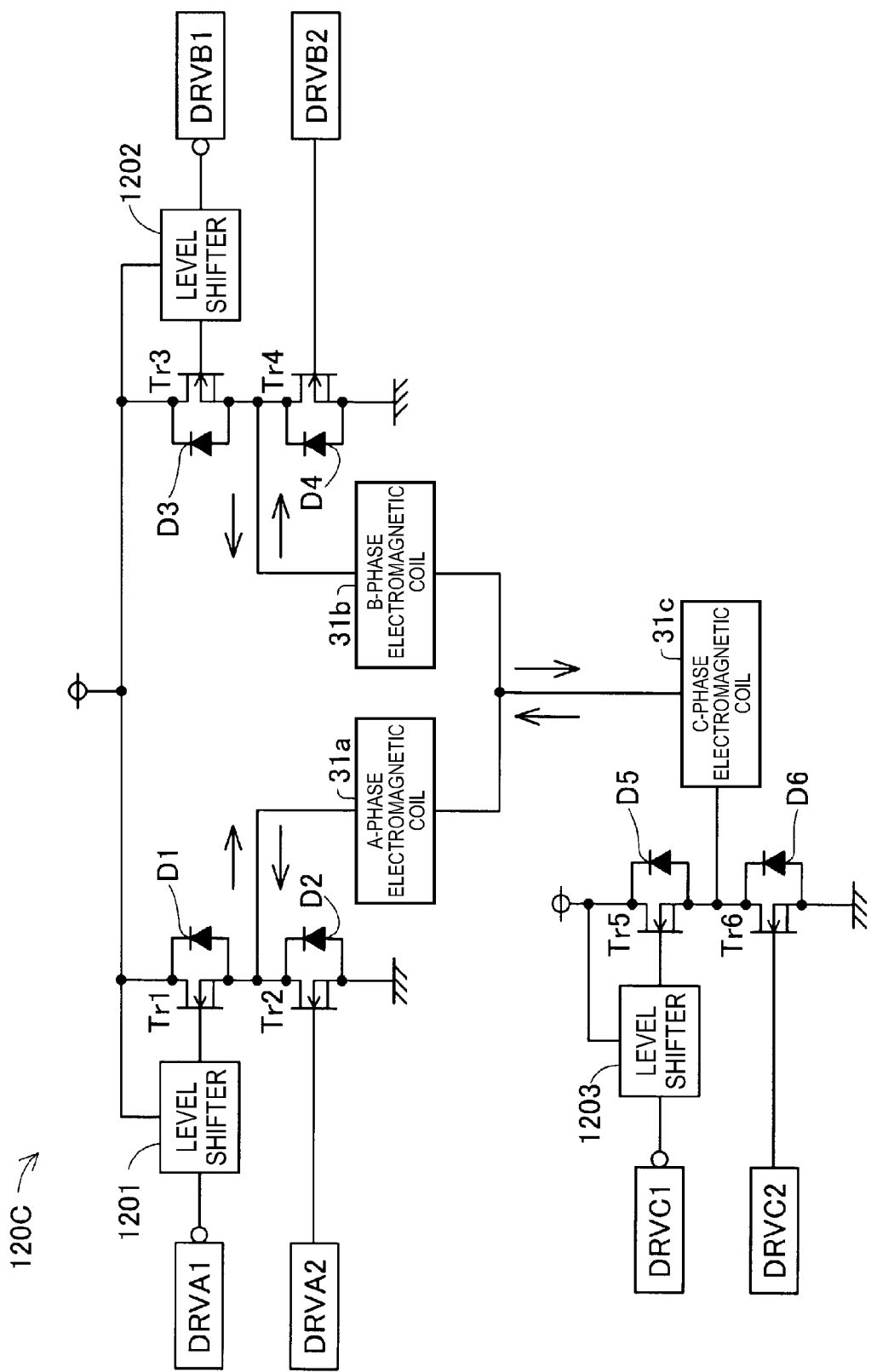
FIG. 26 is a schematic diagram showing a configuration of a driver circuit in the second embodiment.

FIG. 26 is a schematic block diagram showing a configuration of a driver circuit 120C of the second embodiment. The driver circuit 120C is a three-phase bridge circuit for driving the electromagnetic coils 31a, 31b, 31c for three phases in which functions of the A-phase drive part 121, the B-phase drive part 122, and the C-phase drive part 123 are integrated. The driver circuit 120C includes six transistors Tr1 to Tr6, six diodes D1 to D6, and three level shifters 1201 to 1203.

Here, one terminals of the respective electromagnetic coils 31a, 31b, 31c for three phases are connected by Y-connection. Further, the other terminal of the A-phase electromagnetic coil 31a is connected between the first and second transistors Tr1, Tr2 connected in series, the other terminal of the B-phase electromagnetic coil 31b is connected between the third and fourth transistors Tr3, Tr4 connected in series, and the other terminal of the C-phase electromagnetic coil 31c is connected between the fifth and sixth transistors Tr5, Tr6 connected in series.

The respective six diodes D1 to D6 are connected to the drains and sources of the first to sixth transistors Tr1 to Tr6. Further, the three level shifters 1201 to 1203 are connected to the gates of the first transistor Tr1, the third transistor Tr3, and the fifth transistor Tr5, respectively. The respective level shifters 1201 to 1203 adjust the levels of the drive signals input to the respective transistors Tr1, Tr3, Tr5.

The first and second drive signals DRVA1, DRVA2 for the A-phase electromagnetic coil 31a are supplied to the gates of the first and second transistors Tr1, Tr2, respectively. The first and second drive signals DRVB1, DRVB2 for the B-phase electromagnetic coil 31b are supplied to the gates of the third and fourth transistors Tr3, Tr4, respectively. The first and second drive signals DRVC1, DRVC2 for the C-phase electromagnetic coil 31c are supplied to the gates of the fifth and sixth transistors Tr5, Tr6, respectively. Note that inverted signals of the drive signals DRVA1, DRVB1, DRVC1 are input to the first, third, and fifth transistors Tr1, Tr3, Tr5, respectively.

The control unit 100C (FIG. 25) generates the drive signals DRVA1, DRVA2, DRVB1, DRVB2, DRVC1, DRVC2 for the respective phases based on the output signals from the position detection sensors 40a, 40b, 40c for the respective phases in the PWM control part 110C. Further, the driver circuit 120C supplies drive currents to the electromagnetic coils 31a, 31b, 31c for the respective phases in response to the drive signals DRVA1, DRVA2, DRVB1, DRVB2, DRVC1, DRVC2 for the respective phases.

In this manner, in the linear motor 10C of the second embodiment, the electromagnetic coils 31a, 31b, 31c for the respective phases are driven based on the waveform signals for three phases with respect to each phase output by the position detection sensors 40a, 40b, 40c for the respective phases. Therefore, the more highly accurate drive control can be performed compared to the two-phase linear motor 10 of the first embodiment.

B2-2. Position Detection Processing

Figure 27:
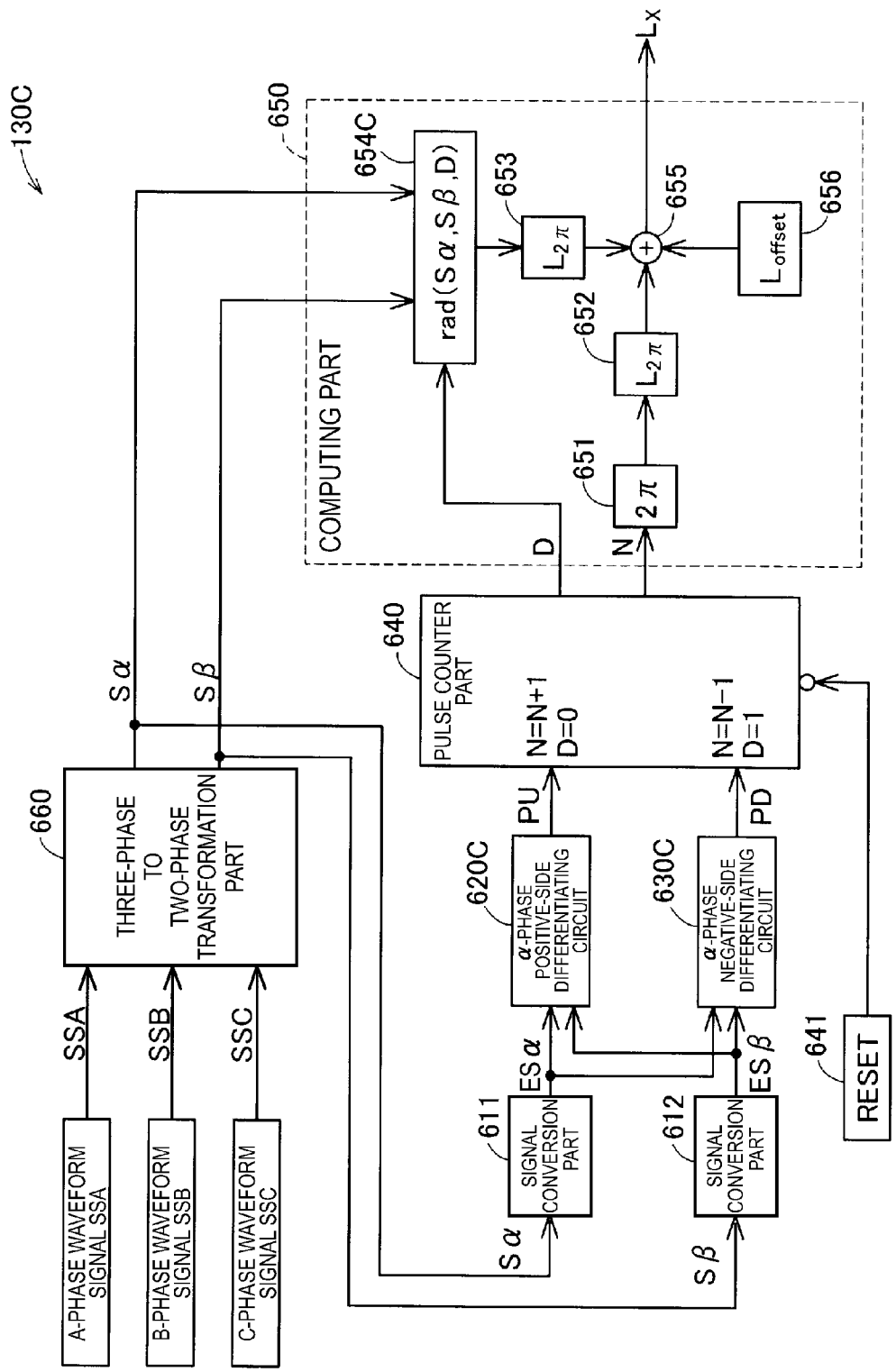
FIG. 27 is a schematic diagram showing an internal configuration of a position detection part in the second embodiment.

FIG. 27 is a schematic block diagram showing an internal configuration of the position detection part 130C in the second embodiment. FIG. 27 is nearly the same as FIG. 16 except that a C-phase waveform signal SSC and a three-phase to two-phase transformation part 660 are added, a-phase differentiating circuits 620C, 630C are provided in place of the A-phase differentiating circuits 620, 630, a rad function part 654C is provided in place of the rad function part 654, and the signs representing the signals to be transmitted are different.

The position detection part 130C executes position detection of the slider 20 using waveform signals SSA, SSB, SSC for three phases as output signals of the position detection sensors 40a, 40b, 40c for three phases. Specifically, the position detection part 130C transforms the waveform signals SSA, SSB, SSC for three phases corresponding to the respective phases of the electromagnetic coils 31 into waveform signals Sα, Sβ for two phases corresponding to the boundary positions between the permanent magnets 21 in the magnet row 211. The processing of transforming the waveform signals SSA, SSB, SSC for three phases into the waveform signals Sα, Sβ for two phases (three-phase to two-phase transformation processing) is executed by the three-phase to two-phase transformation part 660.

FIGS. 28 and 29 are explanatory diagrams for explanation of an example of three-phase to two-phase transformation processing executed by the three-phase to two-phase transformation part 660. In the upper part of FIG. 28, the waveform signals SSA, SSB, SSC respectively output by the position detection sensors 40a, 40b, 40c for three phases are shown by a solid line, a broken line, and a dot-dash line, respectively. Further, in the lower part of FIG. 28, the waveform signals Sα, Sβ for two phases obtained from the waveform signals SSA, SSB, SSC for three phases based on the following transformation expressions (1) using a transformation matrix are shown by a solid line and a dot-dash line, respectively. FIG. 29 shows a table in which two values α, β obtained based on the following transformation expressions (1) for the output values a, b, c of the position detection sensors 40a, 40b, 40c for three phases are listed.

$$a = \cos(\omega \cdot t)$$
$$b = \cos\left(\omega \cdot t - \frac{2\pi}{3}\right)$$
$$c = \cos\left(\omega \cdot t - \frac{4\pi}{3}\right)$$
$$\begin{bmatrix}\alpha\\\beta\end{bmatrix} = 2/3 \begin{bmatrix}1 & -1/2 & -1/2\\ 0 & \sqrt{3}/2 & -\sqrt{3}/2\end{bmatrix}\begin{bmatrix}a\\b\\c\end{bmatrix} \quad (1)$$

Using the transformation expressions (1), the waveform signals SSA, SSB, SSC for three phases corresponding to the respective phases of the electromagnetic coils 31 can be transformed into the waveform signals Sα, Sβ for two phases (α-phase and β-phase) corresponding to the boundary positions between the permanent magnets 21 in the magnet row 211. The waveform signals Sα, Sβ for two phases generated by the three-phase to two-phase transformation part 660 are transmitted to the two signal conversion parts 611, 612 and the rad function part 654C of the computing part 650 (FIG. 27).

Figure 30:
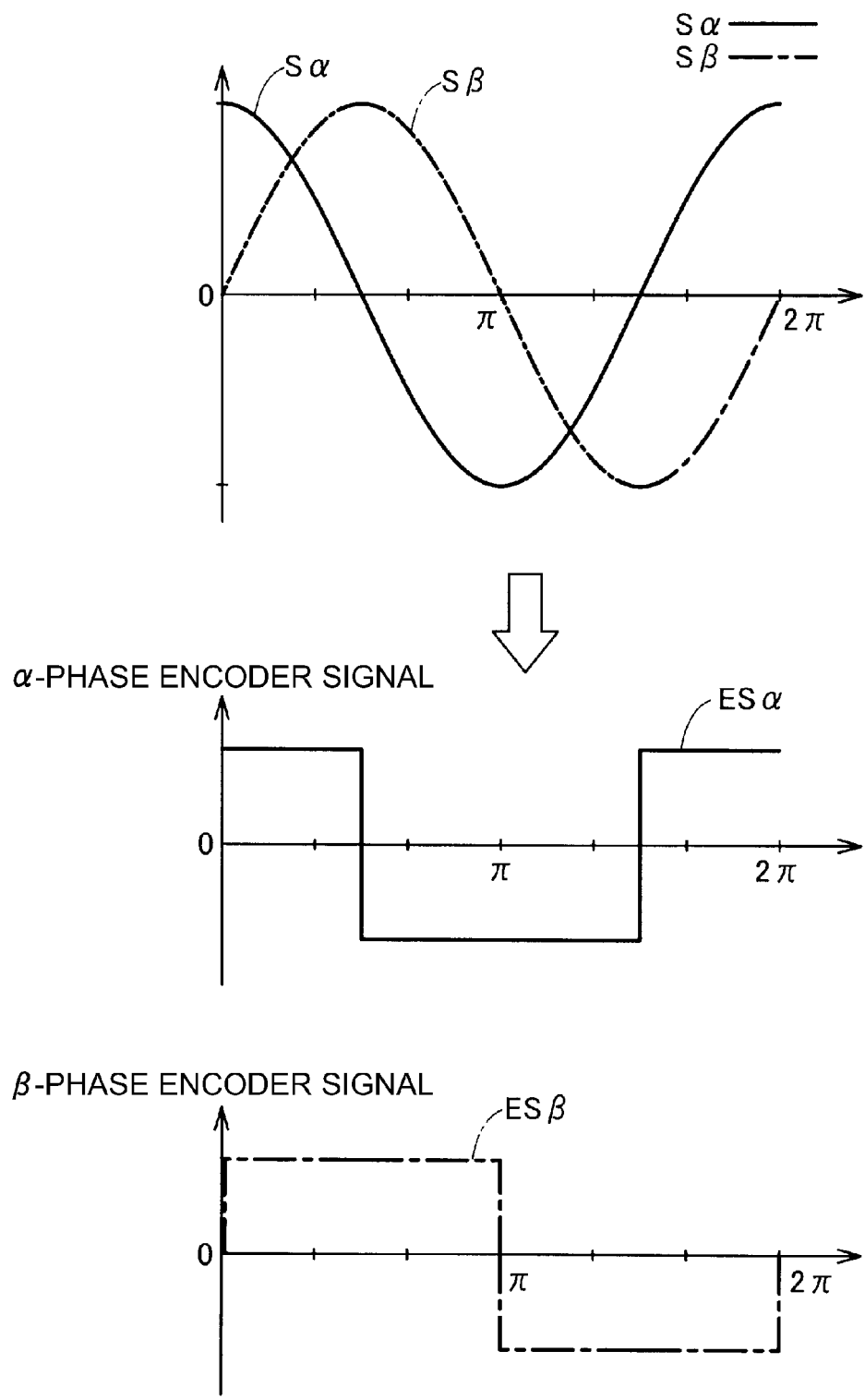
FIG. 30 is an explanatory diagram for explanation of transformation of signal waveforms for two phases into encoder signal waveforms.

FIG. 30 is an explanatory diagram for explanation of generation processing of encoder signals ESα, ESβ for two phases by the two signal conversion parts 611, 612. In the upper part of FIG. 30, the waveform signals Sα, Sβ for two phases that have been shown in the lower part of FIG. 28 are shown. Further, in the lower part of FIG. 30, an α-phase encoder signal ESα and a β-phase encoder signal ESβ are shown in parallel.

The first and second signal conversion parts 611, 612 have the same functions as those explained in the first embodiment, and generate the α-phase encoder signal ESα and the β-phase encoder signal ESβ from the waveform signals Sα, Sβ for two phases. That is, the α-phase encoder signal ESα and the β-phase encoder signal ESβ are pulse signals for which phases and amplitudes of the waveform signals Sα, Sβ for two phases are extracted.

The α-phase positive-side differentiating circuit 620C and the α-phase negative-side differentiating circuit 630C (FIG. 27) have the same configurations as those of the A-phase positive-side differentiating circuit 620 and the A-phase negative-side differentiating circuit 630 that have been explained in the first embodiment (FIGS. 18A to 18F). Both of the differentiating circuits 620C, 630C receive the encoder signals ESα, ESβ for two phases. Then, the α-phase positive-side differentiating circuit 620C outputs a pulse signal PU representing the time when the pulse in the α-phase encoder signal ESα rises when the slider 20 moves in the forward direction. Further, the α-phase negative-side differentiating circuit 630C outputs a pulse signal PD representing the time when the pulse in the α-phase encoder signal ESα falls when the slider 20 moves in the backward direction.

The pulse counter part 640 (FIG. 27) receives the output signals PU, PD from the two differentiating circuits 620C, 630C. Further, the pulse counter part 640 executes increment processing or decrement processing of the count value N in response to the pulses in the output signals PU, PD, and executes setting processing of the variable D as is explained in the first embodiment.

FIGS. 31A and 31B are timing charts respectively showing examples of changes of the above described respective signals Sα, Sβ, ESα, ESβ, PU, PD and the count N. FIGS. 31A and 31B are nearly the same as FIGS. 19A and 19B except that the signs representing the signal names are different. In this manner, also, in the second embodiment, the count value N changes in response to the phase of the waveform signal Sα generated by the three-phase to two-phase transformation part 660 as is the case of the first embodiment in which the count value N changes in response to the phase of the waveform signal SSA.

The computing part 650 (FIG. 27) computes the position coordinate Lx of the slider 20 based on the counter value N and the variable D output by the pulse counter part 640 and the waveform signals Sα, Sβ for two phases. The rad function part 654C has the same function as that of the rad function part 654 of the first embodiment, and outputs radian for the value of the waveform signal Sα based on the two waveform signals Sα, Sβ and the variable D.

As described above, the position detection part 130C of the second embodiment may detect the position of the slider 20 by transforming the waveform signals SSA, SSB, SSC for three phases into waveform signals Sα, Sβ for two phases using the three-phase to two-phase transformation part 660 and executing the same computation as that explained in the first embodiment. Note that the position detection part 130 of the first embodiment does not execute three-phase to two-phase transformation processing, and can perform more accurate position control than that of the position detection part 130C of the second embodiment.

C. Modified Examples

The invention is not limited to the above described examples and embodiments, but can be implemented in various forms without departing from the scope of the invention. For example, the following modifications can be made.

C1. Modified Example 1

In the embodiments, the linear motors 10, 10A, 10B, 10C have included the electromagnetic coils 31 for two phases or three phases and position detection sensors 40 for two or three phases. However, a linear motor may further include electromagnetic coils 31 for plural phases and plural position detection sensors 40 for the respective phases of the electromagnetic coils 31.

C2. Modified Example 2

In the first embodiment, the position detection sensors 40a, 40b for the respective phases have been provided on the outer circumferences of the A-phase electromagnetic coil 31a and the B-phase electromagnetic coil 31b in the center positions of the winding widths of them, respectively. However, the position detection sensors 40a, 40b for the respective phases may be provided in other positions. The position detection sensors 40a, 40b for the respective phases may be provided in positions where the sensors may detect the magnetic flux radially extending in the direction perpendicular to the arrangement direction of the permanent magnets 21 and output signal waveforms for plural phases at the phases equal to the phases of the waveforms of the back electromotive forces generated in the electromagnetic coils 31 at the corresponding phases when the magnet row 211 moves.

C3. Modified Example 3

In the second embodiment, the control unit 100C has executed position detection of the slider 20 by transforming the signals for three phases output by the position detection sensors 40a, 40b, 40c for three phases into signals for two phases. However, the control unit 100C may acquire the output signals of the position detection sensors 40a, 40b for two phases and compute signals for three phases based on the output signals for two phases in the linear motor 10C. Then, the unit may drive the electromagnetic coils 31a, 31b, 31c for three phases based on the signals for three phases.

C4. Modified Example 4

In the first embodiment, the control unit 100 may have the position detection part 130 like the control unit 100C of the second embodiment. In this case, the position detection part 130 may detect the position of the slider 20 using the waveform signals for two phases output by the position detection sensors 40a, 40b for two phases.

C5. Modified Example 5

In the embodiments, the linear motor 10 has been driven by PWM control of the control unit 100. However, the linear motor 10 may be driven using other control methods.

This application claims priority to Japanese Patent Application No. 2010-236323 filed on Oct. 21, 2010. The entire disclosure of Japanese Patent Application No. 2010-236323 is hereby incorporated herein by reference.

What is claimed is:

1. A linear motor comprising:
   a slider unit having a magnet row in which plural permanent magnets are arranged in series so that the same poles are opposed to each other and moving in an arrangement direction of the magnet row by electromagnetic force;
   a stator unit including electromagnetic coils for plural phases arranged along a movement direction of the slider unit and receiving supply of drive currents at different phases with respect to each phase; and
   plural magnetic detector devices that detect changes of magnetic flux with movement of the magnet row for controlling movement of the slider unit,
   wherein the plural magnetic detector devices are provided in response to the phases of the electromagnetic coils for plural phases and arranged along the movement direction of the slider unit at an outer circumferential side of the electromagnetic coils for plural phases, and thereby, detect magnetic flux radially extending in a direction perpendicular to the arrangement direction of the permanent magnets at boundaries between the permanent magnets of the magnet row and output signal waveforms for plural phases at phases equal to phases of waveforms of back electromotive forces generated in the respective electromagnetic coils for plural phases when the magnet row moves.

2. The linear motor according to claim 1, further comprising a control unit that controls drive signals of the linear motor based on output signals for at least two phases output by the plural magnetic detector devices and detects a position of the slider unit for controlling the position of the slider unit.

3. The linear motor according to claim 2, wherein the electromagnetic coils for plural phases are electromagnetic coils for three phases,
   the plural magnetic detector devices output signal waveforms for three phases corresponding to the electromagnetic coils for three phases, and
   the control unit transforms the signal waveforms for three phases into signal waveforms for two phases corresponding to positions of the boundaries between the permanent magnets in the magnet row and detects the position of the slider unit based on the signal waveforms for two phases.

4. The linear motor according to claim 1, wherein aback yoke is provided between the plural magnetic detector devices and the electromagnetic coils for plural phases, and
   plural slits along the movement direction of the slider unit are formed in the back yoke.

* * * * *